United States Patent
Mino et al.

(10) Patent No.: US 7,634,106 B2
(45) Date of Patent: Dec. 15, 2009

(54) SYNTHESIZED IMAGE GENERATION METHOD, SYNTHESIZED IMAGE GENERATION APPARATUS, AND SYNTHESIZED IMAGE GENERATION PROGRAM

(75) Inventors: Kazuhiro Mino, Kanagawa (JP); Hajime Shirasaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 604 days.

(21) Appl. No.: 11/231,907

(22) Filed: Sep. 22, 2005

(65) Prior Publication Data

US 2006/0061598 A1 Mar. 23, 2006

(30) Foreign Application Priority Data

Sep. 22, 2004 (JP) ............... 2004-275860

(51) Int. Cl.
*G06K 9/00* (2006.01)
(52) U.S. Cl. ........................ 382/103; 382/284
(58) Field of Classification Search ................ 382/100, 382/103, 282, 283, 284; 348/239, 584; 358/540, 358/450; 345/629, 234, 634
See application file for complete search history.

(56) References Cited

U.S. PATENT DOCUMENTS

| | | | |
|---|---|---|---|
| 6,526,158 B1 * | 2/2003 | Goldberg | 382/115 |
| 6,876,754 B1 * | 4/2005 | Kellner | 382/103 |
| 7,362,919 B2 * | 4/2008 | Das et al. | 382/284 |
| 2004/0120009 A1 * | 6/2004 | White et al. | 358/1.18 |
| 2004/0125423 A1 | 7/2004 | Nishi et al. | 358/537 |
| 2005/0102246 A1 | 5/2005 | Movellan et al. | 706/12 |
| 2005/0219384 A1 * | 10/2005 | Herberger et al. | 348/239 |

FOREIGN PATENT DOCUMENTS

| | | | |
|---|---|---|---|
| JP | 10-210340 A | | 8/1998 |
| JP | 2000-22929 A | | 1/2000 |
| JP | 2004-54376 A | | 2/2004 |
| JP | 2004-178163 A | | 6/2004 |
| JP | 2005-44330 A | | 2/2005 |
| JP | 2005-149302 A | | 6/2005 |

\* cited by examiner

*Primary Examiner*—Andrew W Johns
(74) *Attorney, Agent, or Firm*—Sughrue Mion, PLLC

(57) ABSTRACT

The synthesized image generation method for generating synthesized image data by extracting face images of characters contained in image data and synthesizing the extracted face images with a template into a plurality of synthesis positions which have been set in advance on the template, the method comprising the steps of: forming groups of the synthesis positions by combining the adjacent synthesis positions; determining an order of the groups according to number of synthesis positions belonging to each of the groups; detecting the face images of the characters contained in the image data; detecting a relationship between the detected face images; distributing the face images to the groups in the determined order according to the relationship between the face images; and generating the synthesized image data by synthesizing the distributed face images with the template into the synthesis positions of the groups.

42 Claims, 13 Drawing Sheets

SYNTHESIZED IMAGE GENERATION METHOD, SYNTHESIZED IMAGE GENERATION APPARATUS, AND SYNTHESIZED IMAGE GENERATION PROGRAM

BACKGROUND OF THE INVENTION

1. Field of the Invention

The present invention relates to a synthesized image generation method, a synthesized image generation apparatus, and a synthesized image generation program, more particularly to a synthesized image generation method, a synthesized image generation device, and a synthesized image generation program that generate a synthesized photo by synthesizing face images of characters cut out from a group photo with a prescribed template.

2. Description of the Related Art

A method of printing a composite image synthesized by superimposing a decorative frame on a photographed image of a person is known as a method for providing interesting photographic prints (see Japanese Patent Application Publication Nos. 2000-22929 and 2004-178163, for example).

Furthermore, a method in which only image portions of characters cut out from an image are synthesizing into another background, such as CG and landscape image, is also known (see Japanese Patent Application Publication No. 10-210340).

Moreover, a method is also suggested that, when eyes in the photographed image of a person are closed, an image with open eyes is generated by extracting and synthesizing an eye section from an image of a character opening eyes (see Japanese Patent Application Publication No. 2004-54376).

Recently, a service of printing a composite image that face images of characters cut out from a group photo captured at a tourist site are synthesized with a backdrop template as shown in FIG. 5 is suggested as a new service in tourist sites. In such a backdrop template, the face images cut out from the group photo are pasted into the synthesis positions which have been set in advance on the template. However, the synthesis positions may be scattered over the template so that lumped groups are formed. In such a case, if the face images are pasted without a proper order, there may be a risk of pasting family members, friends, and couples into separate groups.

SUMMARY OF THE INVENTION

The present invention is contrived in view of such circumstances, and an object thereof is to provide a synthesized image generation method, a synthesized image generation apparatus, and a synthesized image generation program that can generate synthesized image data in which face images of characters having a certain relationship with each other are arranged together.

In order to attain the aforementioned object, a synthesized image generation method for generating synthesized image data by extracting face images of characters contained in image data and synthesizing the extracted face images with a template into a plurality of synthesis positions which have been set in advance on the template, the method comprising the steps of: forming groups of the synthesis positions by combining the adjacent synthesis positions; determining an order of the groups according to number of synthesis positions belonging to each of the groups; detecting the face images of the characters contained in the image data; detecting a relationship between the detected face images; distributing the face images to the groups in the determined order according to the relationship between the face images; and generating the synthesized image data by synthesizing the distributed face images with the template into the synthesis positions of the groups.

According to the present invention, the synthesis positions that are set on the template are grouped by combining the adjacent synthesis positions, and then the order of the groups is determined according to the number of synthesis positions belonging to the respective groups. When the face images of characters contained in the image data are detected, a relationship between individual face images that are detected is detected, and then face images of characters with a short distance between the characters are combined and distributed in the determined order to the respective groups. Then, synthesized image data is generated by synthesizing the distributed face images in the synthesis positions of the respective groups. In other words, since characters that the faces in a photo are close to each other are assumed to have a certain relationship (for example, such as family members, friends, and lovers) with each other, such the characters are arranged so that faces thereof are synthesized as one group. Therefore, it is possible to easily generate synthesized image data in which face images of the characters having a certain relationship with each other are arranged together.

Herein, the term "image data" includes all of the data forming images, such as photographs using negatives or prints, slides comprising a plurality of images, digitalized negative images, and DSC images. Furthermore, this term "image data" is not only data picked up instantaneously, such as photographs, but also a plurality of images picked up continuously in time, such as movies. Incidentally, in the case of images picked up continuously in time, no limitation is placed on the photographic time spacing of photographic frames. In addition, the term "detecting a relationship between individual face images that are detected" includes a case of measuring the distance between the face images of adjacent characters, for example.

In order to attain the aforementioned object, the present invention is directed to a synthesized image generation method for generating synthesized image data by extracting face images of characters contained in image data and synthesizing the extracted face images with a template into a plurality of synthesis positions which have been set in advance on the template, the method comprising the steps of: detecting the face images of the characters contained in the image data; detecting a relationship between the detected face images; forming groups of the face images according to the relationship between the face images; and generating the synthesized image data by synthesizing the face images of the characters with the template into the respective synthesis positions so that the face images of the characters belonging to a same group in the groups are arranged in adjacent synthesis positions.

According to the present invention, face images of characters contained in image data is detected, and a relationship between individual face images is detected. According to the detected relationship, the face images are combined and grouped. Then, the synthesized image data is generated by synthesizing the face images of the respective characters with the template into the synthesis positions which are set on the template, so that the face images of characters belonging to the same group are arranged in close synthesis positions. In other words, image faces having a certain relationship with each other are arranged so as to be synthesized in a single group. Therefore, it is possible to easily generate synthesized image data in which face images of the characters having a certain relationship with each other are arranged together.

Preferably, the relationship between the face images is weighted according to a direction obtained by measuring between the face images of the characters. In this case, weighting is conducted correspondingly to the measured direction of the face images of characters. For example, if the distance in the lateral direction is short, a stronger relationship between the characters is assumed, and then a larger weight is assigned to the distance in the lateral direction. Therefore, it is possible to conduct an arrangement which is more faithful to the relationship between the characters contained in the image data.

Furthermore, the relationship between the characters that face each other is assumed to be strong, and weighting may be conducted according to the measured direction of the face images of characters, so that the face images of characters facing each other are arranged close to each other.

Preferably, the relationship between the face images is weighted according to a size obtained by measuring the face images of the characters. In this case, weighting is conducted correspondingly to the measured size of the face images of characters. For example, since the relationship between a character that the face is captured in large size and a character that the face is captured in small size, is assumed to be that of a parent and a child, then a large weight is assigned to them. Therefore, it is possible to conduct an arrangement which is more faithful to the relationship between the characters contained in the image data.

Furthermore, in this case, weighting may be conducted according to the compatibility of the synthesizable sizes in the synthesis positions on the template and the measured sized of the face images of characters (size of face images). For example, when the size of the face image and the synthesizable size of the synthesis position are almost identical or close to each other, a priority in synthesizing with the template into the synthesis position may be given to this face image. Therefore, it is possible to obtain synthesized image data that are synthesized in a natural state.

Preferably, the relationship between the face images is weighted according to a facial expression obtained by identifying each of the face images of the characters. For example, since the relationship between characters with smiling faces is judged to be strong, a large weight is assigned to them. Therefore, it is possible to conduct an arrangement which is more faithful to the relationship between the characters contained in the image data.

In order to attain the aforementioned object, the present invention is directed to a synthesized image generation method for generating synthesized image data by extracting face images of characters contained in image data and synthesizing the extracted face images with a template into a plurality of synthesis positions which have been set in advance on the template, the method comprising the steps of: capturing first image data and second image data separately; detecting the face images from each of the first image data and the second image data; measuring a movement direction and a movement amount of each of the detected face images according to the first image data and the second image data; detecting the face images for which the measured movement amount is not less than a threshold value; forming groups of the face images according to the measured movement direction and at least one of positions of the face images in the first image data and positions of the face images in the second image data; and generating the synthesized image data by synthesizing the face images with the template into the respective synthesis positions so that the face images of the characters belonging to a same group in the groups are arranged in the adjacent synthesis positions.

According to the present invention, first, the image data is captured two times separately, and the face images are detected from the two captured image data. Next, the movement direction and movement amount of each detected face image are measured, and a face image for which the measured movement amount is not less than the threshold is detected. At this time, the detected face images are divided into groups according to the movement direction and at least one of positions before and after the movement. Then, synthesized image data is generated by pasting the face images of characters in the synthesis positions which have been set on the template, so that the face images of characters belonging to the same group are arranged in close synthesis positions. In other words, when the image data is captured twice, it is assumed that the second photo is captured in a more friendly atmosphere than the first photo, so that characters who are in close relationship with one another are captured close to each other (when the second photo is captured, those who are on good terms with each other keep close to each other). Under this assumption, the movement direction and movement amount of the face images of characters in the first and second photos are measured. At this time, face images having a certain movement amount are grouped according to the degree of concentration of movement directions, and then synthesis is so conducted that the groups are arranged together on the template. Therefore, it is possible to easily generate synthesized image data in which the face images of characters having a certain relationship with each other are arranged together.

The present invention is also directed to the synthesized image generation method further comprising a step of adjusting color of each of the face images synthesized with the template according to the template. In this case, since color of face images is adjusted according to the theme of the template or the like, it is possible to obtain more interesting synthesized image data.

Furthermore, the present invention is also directed to the synthesized image generation method further comprising a step of: outputting successively a plurality of image data comprising the synthesized image data together with music, wherein a timing of outputting the synthesized image data is set according to the music. In this case, the timing of the output of the synthesized image data may be determined according to the music. Therefore, since the synthesized image data is outputted synchronously with music, it is possible to obtain more interesting outputting.

In order to attain the aforementioned object, the present invention is directed to a synthesized image generation apparatus which generates synthesized image data by extracting face images of characters contained in image data and synthesizing the extracted face images with a template into a plurality of synthesis positions which have been set in advance on the template, the apparatus comprising: a synthesis position grouping device which forms groups of the synthesis positions by combining the adjacent synthesis positions; a group order setting device which sets an order of the groups according to number of the synthesis positions grouped by the synthesis position grouping device; a face image detection device which detects the face images of the characters contained in the image data; a relationship detection device which detects a relationship between the face images detected by the face image detection device; a synthesis position adjustment device which allocates the face images to the groups of the synthesis positions in the set order by combining the face images according to the detected relationship between the face images; and an image synthesis device which synthesizes the face images with the template into the respective synthesis positions allocated by the synthesis position adjustment device so as to generate the synthesized image data.

According to the present invention, it is possible to easily generate the synthesized image data in which the face images of characters having a certain relationship with each other are arranged together.

In order to attain the aforementioned object, the present invention is directed to a synthesized image generation apparatus which generates synthesized image data by extracting face images of characters contained in image data and synthesizing the extracted face images with a template into a plurality of synthesis positions which have been set in advance on the template, the apparatus comprising: a face image detection device which detects the face images of the characters contained in the image data; a relationship detection device which detects a relationship between the face images detected by the face image detection device; a grouping device which forms groups of the face images by combining the face images according to the detected relationship between the face images; a synthesis position adjustment device which allocates the face images to the synthesis positions so that the face images belonging to a same group in the groups are arranged in the adjacent synthesis positions; and an image synthesis device which synthesizes the face images with the template into the respective synthesis positions allocated by the synthesis position adjustment device so as to generate the synthesized image data.

According to the present invention, it is possible to easily generate the synthesized image data in which the face images of characters having a certain relationship with each other are arranged together.

Preferably, the relationship detection device weights the relationship between the face images according to a direction obtained by measuring each of the face images of the characters. In this case, an arrangement which is more faithful to the relationship between the characters contained in the image data can be conducted.

Preferably, the relationship detection device weights the relationship between the face images according to a size obtained by measuring each of the face images of characters. In this case, it is possible to conduct an arrangement which is more faithful to the relationship between the characters contained in the image data.

Preferably, the relationship detection device weights the relationship between the face images according to a facial expression obtained by identifying each of the face images of the characters. In this case, it is possible to conduct an arrangement which is more faithful to the relationship between the characters contained in the image data.

In order to attain the aforementioned object, the present invention is directed to a synthesized image generation apparatus which generates synthesized image data by extracting face images of characters contained in image data and synthesizing the extracted face images with a template into a plurality of synthesis positions which have been set in advance on the template, the apparatus comprising: a face image detection device which detects the face images of the characters from first image data and second image data which are captured separately; a movement direction measurement device which measures a movement direction of each of the face images detected by the face image detection device; a movement amount measurement device which measures a movement amount of each of the face images detected by the face image detection device; a face image grouping device which detects the face images for which the measured movement amount is not less than a threshold value so as to form group of the detected face images according to the movement direction and at least one of positions of the face images in the first image data and positions of the face images in the second image data; a synthesis position adjustment device which allocates the face images to the respective synthesis positions so that the face images of the characters belonging to a same group in the groups are arranged in the adjacent synthesis positions; and an image synthesis device which synthesizes the face images with the template into the respective synthesis positions allocated by the synthesis position adjustment device so as to generate the synthesized image data.

According to the present invention, it is possible to easily generate the synthesized image data in which the face images of characters having a certain relationship with each other are arranged together.

Preferably, the image synthesis device adjusts color of each of the face images according to the template.

Furthermore, the present invention is also directed to the synthesized image generation apparatus further comprising: an image output device which successively outputs a plurality of image data comprising the synthesized image data together with music, wherein the image output device determines a timing of outputting the synthesized image data according to the music.

In order to attain the aforementioned object, the present invention is directed to a computer readable medium having embodied thereon a computer program for processing by a computer, the computer program comprising: a first code segment for forming groups of a plurality of synthesis positions by combining the adjacent synthesis positions, the synthesis positions having been set in advance on a template; a second first code segment for setting an order of the groups according to number of synthesis positions belonging to each of the groups; a third code segment for detecting face images of characters contained in image data; a fourth code segment for detecting a relationship between the detected face images; a fifth code segment for distributing the face images to the groups in the set order according to the relationship between the face images; and a sixth code segment for generating synthesized image data by synthesizing the distributed face images with the template into the synthesis positions of the groups. The present invention is also directed to the medium wherein the medium is a propagated signal. The present invention is also directed to the medium wherein the propagated signal is a carrier wave.

According to the present invention, it is possible to easily generate the synthesized image data in which the face images of characters having a certain relationship with each other are arranged together.

In order to attain the aforementioned object, the present invention is directed to a computer readable medium having embodied thereon a computer program for processing by a computer, the computer program comprising: a first code segment for detecting face images of characters contained in image data; a second code segment for detecting a relationship between the detected face images; a third code segment for forming groups of the face images according to the detected relationship between the face images; and a fourth code segment for generating synthesized image data by synthesizing the face images of the characters with a template into a plurality of synthesis positions so that the face images of the characters belonging to a same group in the groups are arranged in the adjacent synthesis positions, the synthesis positions having been set in advance on the template. The present invention is also directed to the medium wherein the medium is a propagated signal. The present invention is also directed to the medium wherein the propagated signal is a carrier wave.

According to the present invention, it is possible to easily generate the synthesized image data in which the face images of characters having a certain relationship with each other are arranged together.

In order to attain the aforementioned object, the present invention is directed to a computer readable medium having embodied thereon a computer program for processing by a computer, the computer program comprising: a first code segment for capturing first image data and second image data separately; a second code segment for detecting the face images from each of the first image data and the second image data; a third code segment for measuring a movement direction and a movement amount of each of the detected face images according to the first image data and the second image data; a fourth code segment for detecting the face images for which the measured movement amount is not less than a threshold value; a fifth code segment for forming groups of the face images according to the measured movement direction and at least one of positions of the face images in the first image data and positions of the face images in the second image data; and a sixth code segment for generating synthesized image data by synthesizing the face images with a template into a plurality of synthesis positions so that the face images of the characters belonging to a same group in the groups are arranged in the adjacent synthesis positions, the synthesis positions having been set in advance on the template. The present invention is also directed to the medium wherein the medium is a propagated signal. The present invention is also directed to the medium wherein the propagated signal is a carrier wave.

According to the present invention, it is possible to easily generate the synthesized image data in which the face images of characters having a certain relationship with each other are arranged together.

In order to attain the aforementioned object, another aspect of the present invention is to provide a synthesized image generation method for generating synthesized photo by cutting out face images of characters captured in a group photo and synthesizing the cut face images with a template into a plurality of synthesis positions which have been set in advance on the template, the method comprising the steps of: forming groups of the synthesis positions by combining the adjacent synthesis positions; determining an order of the groups according to number of synthesis positions belonging to each of the groups; detecting the face images of the characters captured in the group photo; detecting a relationship between the detected face images; distributing the face images to the groups in the determined order according to the relationship between the face images; and generating the synthesized photo by synthesizing the distributed face images with the template into the synthesis positions of the groups.

According to this aspect, the synthesis positions which have been set on the template are grouped by combining the adjacent synthesis positions, and then the order of the groups is determined according to the number of synthesis positions belonging to the respective groups. When the face images of characters captured in the group photo are detected, the distance between the face images of adjacent characters is measured. At this time, a relationship between individual face images that are detected is detected, and then face images of characters with a short distance between the characters are combined and distributed in the determined order to the respective groups. Then, a synthesized photo is generated by pasting the distributed face images in the synthesis positions of the respective groups. In other words, since characters that the faces in a photo are close to each other are assumed to have a certain relationship (for example, such as family members, friends, and lovers) with each other, such the characters are arranged so that faces thereof are synthesized as one group. Therefore, it is possible to easily generate a synthesized photo in which face images of the characters having a certain relationship with each other are arranged together.

In order to attain the aforementioned object, another aspect of the present invention is to provide a synthesized image generation method for generating synthesized photo by cutting out face images of characters captured in a group photo and synthesizing the cut face images with a template into a plurality of synthesis positions which have been set in advance on the template, the method comprising the steps of: detecting the face images of the characters captured in the group photo; detecting a relationship between the detected face images; forming groups of the face images according to the relationship between the face images; and generating the synthesized photo by synthesizing the face images of the characters with the template into the respective synthesis positions so that the face images of the characters belonging to a same group in the groups are arranged in adjacent synthesis positions.

According to this aspect, the face images of the characters captured in a group photo are detected, and the distance between the face images of adjacent characters is measured. At this time, the face images of the characters with a small distance between the characters are combined and grouped, and then a synthesized photo is generated by pasting the face images of the characters in the synthesis positions which have been set on the template so that the face images of the characters belonging to the same group are arranged in close synthesis positions. In other words, since characters that the faces in a photo are close to each other are assumed to have a certain relationship with each other, then the characters are arranged so that faces thereof are synthesized as one group. Therefore, it is possible to easily generate a synthesized photo in which the face images of characters having a certain relationship with each other are arranged together.

Another aspect of the present invention is also to provide the synthesized image generation method wherein the relationship between the face images is weighted according to a direction obtained by measuring between the face images of the characters.

According to this aspect, the measured distance is weighted corresponding to the measured direction of the face images of characters. For example, if the distance in the lateral direction is short, a stronger relationship between the characters is assumed, and hence a larger weight is assigned to the distance in the lateral direction. Therefore, it is possible to conduct an arrangement which is more faithful to the relationship between the characters captured in the group photo.

Another aspect of the present invention is to provide the synthesized image generation method wherein the relationship between the face images is weighted according to a size obtained by measuring the face images of the characters.

According to this aspect, weighting is conducted corresponding to the measured size of the face images of characters. For example, the relationship between a character that the face is captured in large size on the photo and a character that the face is captured in small size on the photo is assumed to be that of a parent and a child, and a large weight is assigned to them. Therefore, it is possible to conduct an arrangement which is more faithful to the relationship between the characters captured in the group photo.

In order to attain the aforementioned object, another aspect of the present invention is to provide a synthesized image generation method for generating synthesized photo by cutting out face images of characters captured in a group photo and synthesizing the cut face images with a template into a plurality of synthesis positions which have been set in advance on the template, the method comprising the steps of: capturing a first group photo and a second group photo separately; detecting the face images from each of the first group photo and the second group photo; measuring a movement direction and a movement amount of each of the detected face images according to the first group photo and the second group photo; detecting the face images for which the measured movement amount is not less than a threshold value; forming groups of the face images according to the measured movement direction and at least one of positions of the face images in the first group photo and positions of the face images in the second group photo; and generating the synthesized photo by synthesizing the face images with the template into the respective synthesis positions so that the face images of the characters belonging to a same group in the groups are arranged in the adjacent synthesis positions.

According to this aspect, when the group photos are captured two times separately, the face images are detected from the two captured group photos, and then the movement direction and movement amount of the detected face images are measured. At this time, a face image for which the measured movement amount is not less than the threshold is detected, and division into groups is conducted according to the measured movement direction and at least one of positions before and after the movement. Then, a synthesized photo is generated by pasting the face image of each character in the synthesis positions which have been set on the template, so that the face images of the characters belonging to the same group are arranged in close synthesis positions. In other words, when the group photo is captured twice, it is assumed that the second photo is captured in a more friendly atmosphere that the first photo and those who are in close relationship with one another are captured close to each other (when the second photo is captured, those who are on good terms with each other keep close to each other). Under an assumption, the movement direction and movement amount of the face image of the characters with each other in the first and second photo are measured, face images having a certain movement amount are grouped according to the degree of concentration of movement directions, and hence synthesis is so conducted that the groups are arranged together on the template. Therefore, it is possible to easily generate a synthesized photo in which the face images of characters having a certain relationship with each other are arranged together.

In order to attain the aforementioned object, yet another aspect of the present invention is to provide a synthesized image generation apparatus which generates synthesized photo by cutting out face images of characters captured in a group photo and synthesizing the cut face images with a template into a plurality of synthesis positions which have been set in advance on the template, the apparatus comprising: a synthesis position grouping device which forms groups of the synthesis positions by combining the adjacent synthesis positions; a group order setting device which sets an order of the groups according to number of the synthesis positions grouped by the synthesis position grouping device; a face image detection device which detects the face images of the characters captured in the group photo; a relationship detection device which detects a relationship between the face images detected by the face image detection device; a synthesis position adjustment device which allocates the face images to the groups of the synthesis positions in the set order by combining the face images according to the detected relationship between the face images; and an image synthesis device which synthesizes the face images with the template into the respective synthesis positions allocated by the synthesis position adjustment device so as to generate the synthesized photo.

According to this aspect, it is possible to easily generate the synthesized photo in which the face images of characters having a certain relationship with each other are arranged together.

In order to attain the aforementioned object, yet another aspect of the present invention is to provide a synthesized image generation apparatus which generates synthesized photo by cutting out face images of characters captured in a group photo and synthesizing the cut face images with a template into a plurality of synthesis positions which have been set in advance on the template, the apparatus comprising: a face image detection device which detects the face images of the characters captured in the group photo; a relationship detection device which detects a relationship between the face images detected by the face image detection device; a grouping device which forms groups of the face images by combining the face images according to the detected relationship between the face images; a synthesis position adjustment device which allocates the face images to the synthesis positions so that the face images belonging to a same group in the groups are arranged in the adjacent synthesis positions; and an image synthesis device which synthesizes the face images with the template into the respective synthesis positions allocated by the synthesis position adjustment device so as to generate the synthesized photo.

According to this aspect, it is possible to easily generate the synthesized photo in which the face images of characters having a certain relationship with each other are arranged together.

Furthermore, yet another aspect of the present invention is to also provide the synthesized image generation apparatus wherein the relationship detection device weights the relationship between the face images according to a direction obtained by measuring each of the face images of the characters.

According to this aspect, an arrangement which is more faithful to the relationship between the characters captured in the group photo can be conducted.

Furthermore, yet another aspect of the present invention is also to provide the synthesized image generation apparatus wherein the relationship detection device weights the relationship between the face images according to a size obtained by measuring each of the face images of the characters.

According to this aspect, it is possible to conduct an arrangement which is more faithful to the relationship between the characters captured in the group photo.

In order to attain the aforementioned object, still another aspect of the present invention is to provide a synthesized image generation apparatus which generates synthesized photo by cutting out face images of characters captured in a group photo and synthesizing the cut face images with a template into a plurality of synthesis positions which have been set in advance on the template, the apparatus comprising: a face image detection device which detects the face images of the characters from a first group photo and a second group photo which are captured separately; a movement direction measurement device which measures a movement direction of each of the face images detected by the face image detection device; a movement amount measurement device which measures a movement amount of each of the face images detected by the face image detection device; a face image grouping device which detects the face images for which the measured movement amount is not less than a threshold value so as to form group of the detected face images according to the movement direction and at least one of positions of the face images in the first group photo and positions of the face images in the second group photo; a synthesis position adjustment device which allocates the face images to the respective synthesis positions so that the face images of the characters belonging to a same group in the groups are arranged in the adjacent synthesis positions; and an image synthesis device which synthesizes the face images with the template into the respective synthesis positions allocated by the synthesis position adjustment device so as to generate the synthesized photo.

According to this aspect, it is possible to easily generate the synthesized photo in which the face images of characters having a certain relationship with each other are arranged together.

In order to attain the aforementioned object, still another aspect of the present invention is to provide a computer readable medium having embodied thereon a computer program for processing by a computer, the computer program comprising: a first code segment for forming groups of a plurality of synthesis positions by combining the adjacent synthesis positions, the synthesis positions having been set in advance on a template; a second first code segment for setting an order of the groups according to number of synthesis positions belonging to each of the groups; a third code segment for detecting face images of characters captured in a group photo; a fourth code segment for detecting a relationship between the detected face images; a fifth code segment for distributing the face images to the groups in the set order according to the relationship between the face images; and a sixth code segment for generating a synthesized photo by synthesizing the distributed face images with the template into the synthesis positions of the groups. In this case, it is preferable that the medium is a propagated signal. In addition, it is also preferable that the propagated signal is a carrier wave.

According to this aspect, it is possible to easily generate the synthesized photo in which the face images of characters having a certain relationship with each other are arranged together.

In order to attain the aforementioned object, still another aspect of the present invention is to provide a computer readable medium having embodied thereon a computer program for processing by a computer, the computer program comprising: a first code segment for detecting face images of characters captured in a group photo; a second code segment for detecting a relationship between the detected face images; a third code segment for forming groups of the face images according to the detected relationship between the face images; and a fourth code segment for generating a synthesized photo by synthesizing the face images of the characters with a template into a plurality of synthesis positions so that the face images of the characters belonging to a same group in the groups are arranged in the adjacent synthesis positions, the synthesis positions having been set in advance on the template. In this case, it is preferable that the medium is a propagated signal. In addition, it is also preferable that the propagated signal is a carrier wave.

According to this aspect, it is possible to easily generate the synthesized photo in which the face images of characters having a certain relationship with each other are arranged together.

In order to attain the aforementioned object, still another aspect of the present invention is to a computer readable medium having embodied thereon a computer program for processing by a computer, the computer program comprising: a first code segment for capturing a first group photo and a second group photo separately; a second code segment for detecting the face images from each of the first group photo and the second group photo; a third code segment for measuring a movement direction and a movement amount of each of the detected face images according to the first group photo and the second group photo; a fourth code segment for detecting the face images for which the measured movement amount is not less than a threshold value; a fifth code segment for forming groups of the face images according to the measured movement direction and at least one of positions of the face images in the first group photo and positions of the face images in the second group photo; and a sixth code segment for generating a synthesized photo by synthesizing the face images with a template into a plurality of synthesis positions so that the face images of the characters belonging to a same group in the groups are arranged in the adjacent synthesis positions, the synthesis positions having been set in advance on the template. In this case, it is preferable that the medium is a propagated signal. In addition, it is also preferable that the propagated signal is a carrier wave.

According to this aspect, the synthesized photo in which the face images of characters having a certain relationship with each other are arranged together can be generated in a simple manner.

Incidentally, when a template and face images are synthesized, a variety of processing steps may be implemented so that more natural image data can be obtained. For example, well-known technologies may be employed so that the synthesis zones of the template and edge portions of the face images have a more natural color. Furthermore, the inclination of the face images may be changed according to the synthesis positions of the template.

As described above, according to the present invention, it is possible to generate synthesized image data in which the images of characters having a certain relationship with each other are arranged together.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
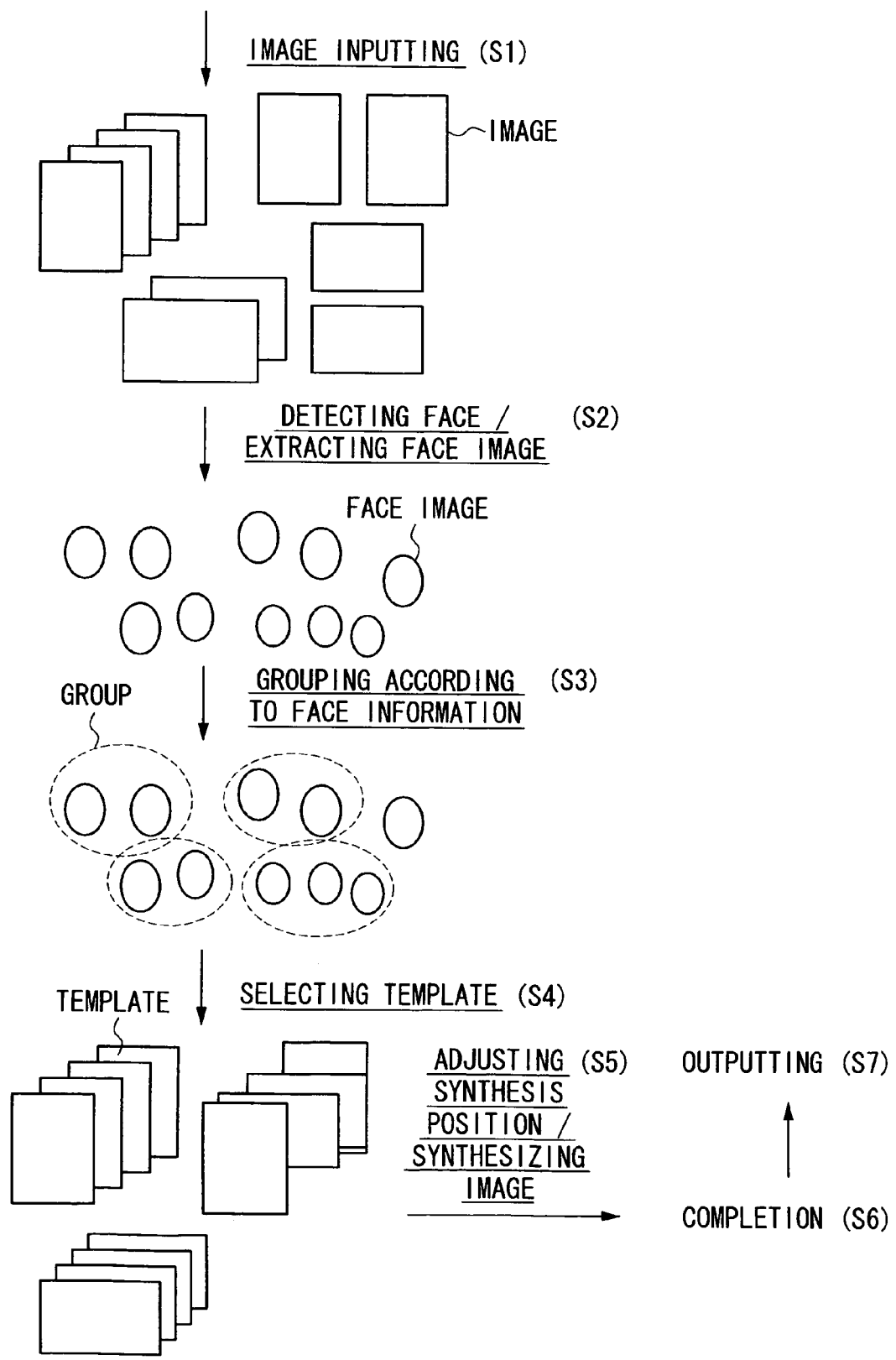
FIG. 1 is a diagram showing an example of the entire flowchart for generating synthesized image data.

First, the entire flowchart for generating the synthesized image data according to the present invention will be described. FIG. 1 is a diagram showing an example of the entire flowchart for generating synthesized image data. Initially, image data is inputted in a synthesized image data generation apparatus, according to a negative, a usual DSC (digital still camera), a DSC attached to a cellular phone, a DV (digital video), or the like (step S1 in FIG. 1). At this time, the inputted image data includes usual photos, group photos, and the like, for example. The inputted image data may be image data comprising photos with a plurality of faces. In addition, one image data or a plurality thereof may be inputted.

Next, in the synthesized image generation apparatus, the face images are detected and extracted from the inputted image data (step S2). Next, the extracted face images are divided into groups (grouped) according to the prescribed face information indicating the relationship between the face images (step S3). Next, a template which is to be synthesized with the face images is selected by a user or the like (step S4). In this case, one template or a plurality of templates may be used. Next, the synthesis positions on the template relating to the face images are adjusted, and the extracted face images are synthesized with the template into the adjusted synthesis positions (step S5). Then, the generation of synthesized image data is completed (step S6).

The synthesis positions of the face images are adjusted according to the grouping information, and the face images and the template are synthesized in adequate positions. At the same time, various processing operations are implemented so that the face images and the template are synthesized in a natural state. Image processing, such as the so-called antialias processing or gradation processing, can be implemented on the frame circumferential portions of face images. The generated and synthesized image data may be in any form. For example, they can be arranged in the form of a single image such as a postcard or a photo, or as an album in which multiple images are arranged together, or slide show in which multiple images are displayed one by one as time passes.

After the synthesized image data has been generated (step S6), the generated synthesized image data is outputted as required (step S7). The synthesized image data generated in this manner is wired and outputted to any location (e.g., a personal computer (PC), a portable device such as a cellular phone, and a laboratory) according to the requirements relating to the synthesized image data generated in this manner. Furthermore, the output of the synthesized image data is conducted in any format. For example, the synthesized image data is outputted by printing on paper, by displaying on a screen, or by recording on a computer-readable medium such as a hard disk or a flash memory.

Hereinafter, specific embodiments of the synthesized image generation method, the synthesized image generation apparatus, and the synthesized image generation program according to the present invention will be described in detail.

First Embodiment

Figure 2:
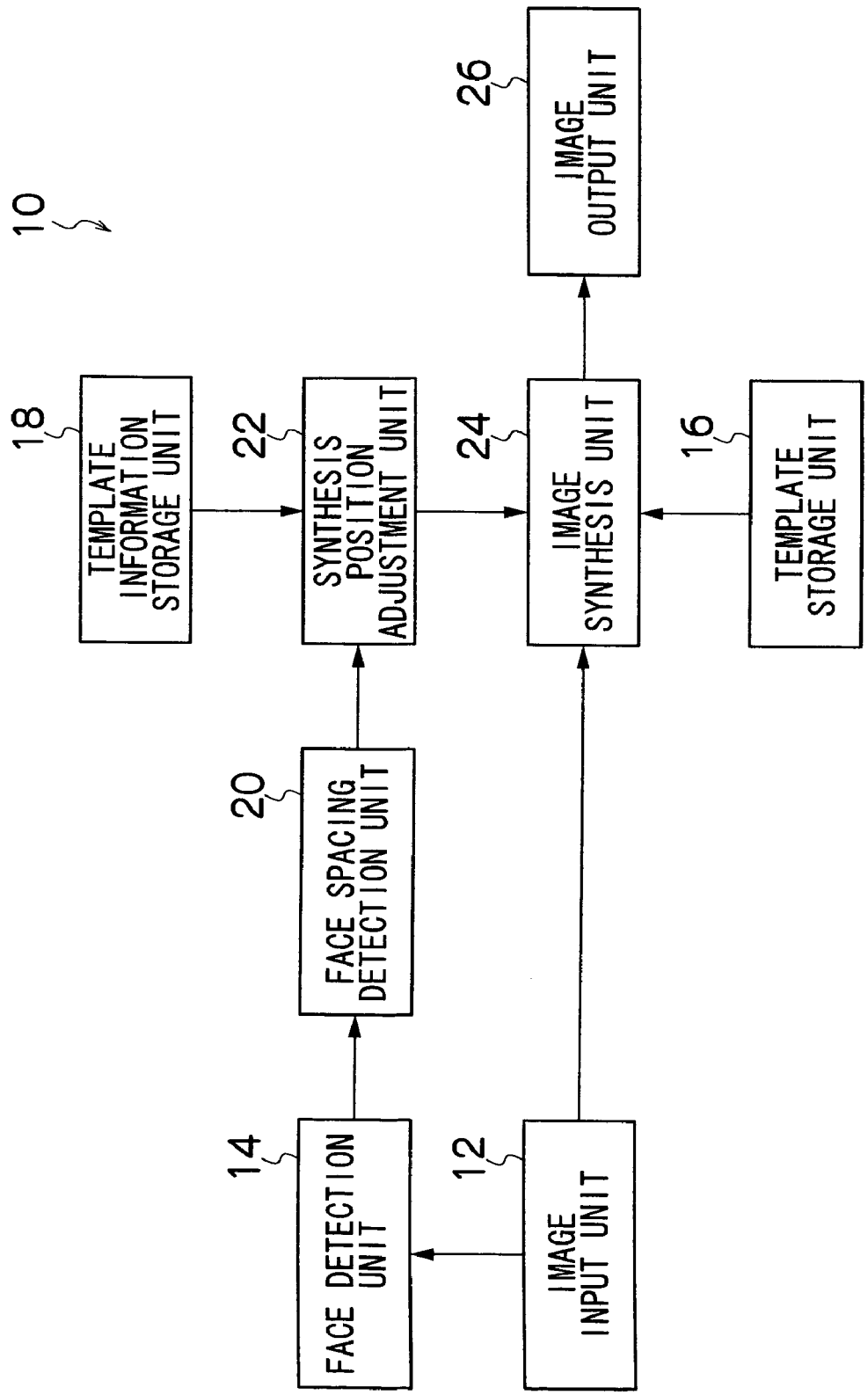
FIG. 2 is a block diagram showing configuration of a synthesized image generation apparatus according to a first embodiment of the present invention.

FIG. 2 is a block diagram of a synthesized image generation apparatus according to a first embodiment of the present invention. As shown in FIG. 2, the synthesized image generation apparatus 10 in the present embodiment comprises an image input unit 12, a face detection unit 14, a template storage unit 16, a template information storage unit 18, a face spacing detection unit 20, a synthesis position adjustment unit 22, an image synthesis unit 24, and an image output unit 26.

The image input unit 12 captures image data which is captured as a group photo. In this case, there is no specific limitation relating to the capture method. The image data may be captured directly from a digital camera or via a memory card reader from a memory card storing the image data. In addition, image data sent via a network may be received and captured.

Furthermore, the image data used in the present embodiment is not limited to those captured by a digital camera. Image data obtained by reading a photographic print with a scanner may be also used.

The face detection unit 14 detects face of a character from the image data which is captured from the group photo by the image input unit 12. Since well-known technologies may be adapted to a method for detecting the face from the image obtained by photographing the person, then detailed description of the detection method is omitted here. For example, pixels having a color indicated as a skin pigmentation and color close thereto are retrieved from an original image, and then a region which has been retrieved is detected as a face region. For example, this detection processing is carried out by establishing a range of skin pigmentation on a color space which distinguishes between the skin pigmentation and other colors from information relating to the skin pigmentation which has been sampled in advance so as to determine whether or not the color of each pixel is within the established range.

The face spacing detection unit 20 detects a distance between face images of two adjacent characters according to the characters detected by the face detection unit 14. For example, the center of gravity in the face can be used as a detection position detected by the face spacing detection unit 20. Facial parts (eyes, pupils of the eyes, center between the eyes, nose, mouth, ears, head, jaw, and the like) may be also used instead of the center of gravity. Furthermore, facial parts may be composed of a left end in one character of the adjacent characters, and right end in another character of the adjacent characters. More specifically, for example, the right eye of one character and the left eye of another character, or the right ear of one character and the left ear of another character may be used.

The template storage unit 16 stores a plurality of types of template data used for image synthesis. The template information storage unit 18 stores individually template information for each of the templates stored in the template storage unit 16. More specifically, the template information includes "position information (information on position for pasting a face image)", "group information (grouped information on synthesis position)", "information on the distance between synthesis positions (information on the distance between adjacent synthesis positions)", and the like, having the synthesis position set in each of the templates, respectively.

The synthesis position adjustment unit 22 determines an arrangement of face images pasted on the template, according to the template information and the distance between the face images of the entire characters detected by the face spacing detection unit 20. Hereinafter, this issue will be described in detail.

The image synthesis unit 24 pastes the face images of characters, which are cut out from the image data relating to the group photo, on the synthesis positions which have been set on the template according to the arrangement information on face images determined by the synthesis position adjustment unit 22, so as to generate a synthesized photo.

The image output unit 26 outputs the image data of the synthesized photo generated by the image synthesis unit 24 to a monitor. Furthermore, if necessary, the image data is outputted to a printer, so that the generated synthesized photo image is printed on photographic paper.

Figure 3:
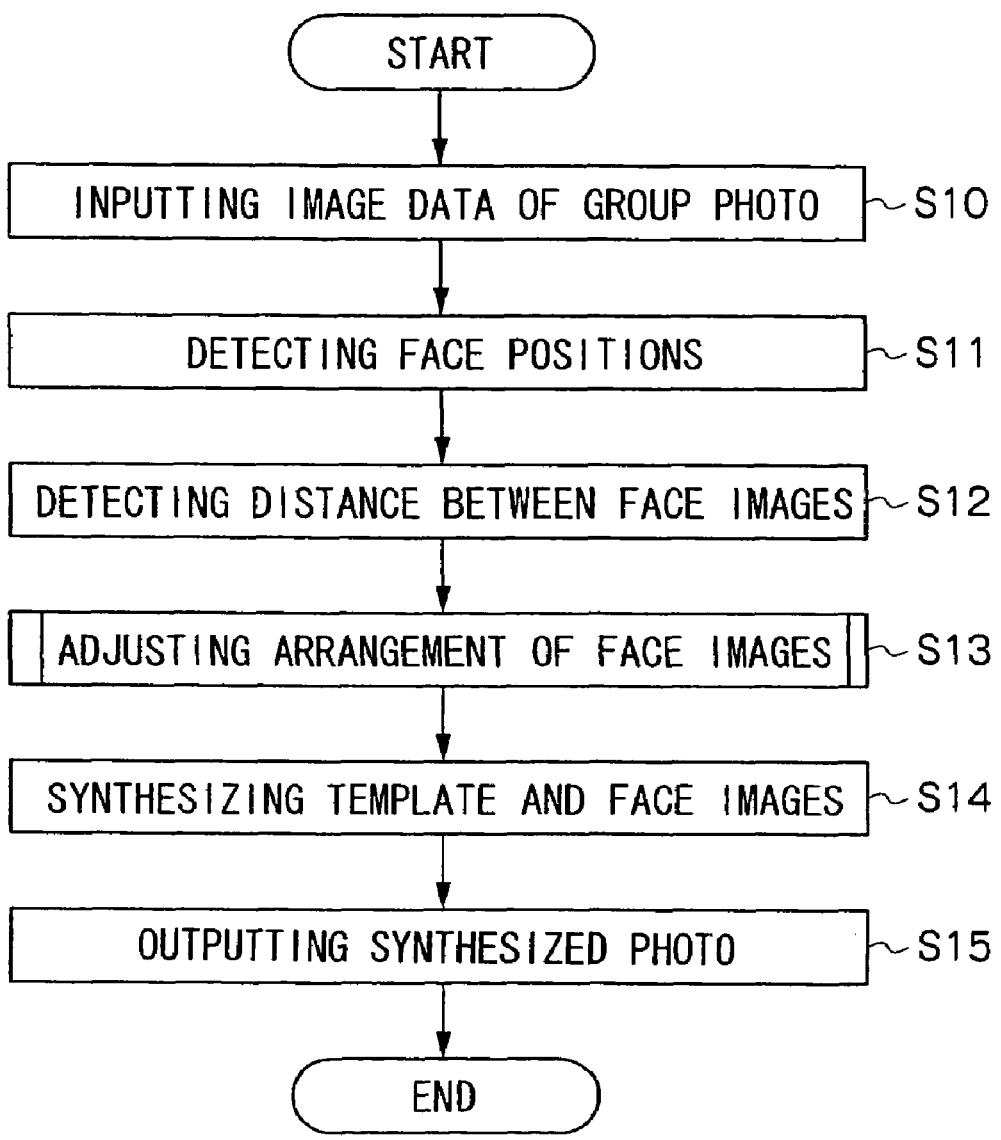
FIG. 3 is a flowchart showing a sequence of generating a synthesized photo in the synthesized image generation apparatus according to the first embodiment of the present invention.

FIG. 3 is a flowchart showing a sequence of generating a synthesized photo in the synthesized image generation apparatus 10 according to the first embodiment.

First, image data of a group photo used for image synthesis is inputted into the image input unit 12 (step S10). The image data inputted from the image input unit 12 are sent to the face detection unit 14, and then the faces which have been captured in this image are detected (step S11). Next, a distance between the adjacent faces is detected by the face spacing detection unit 20 according to position information between the faces detected by face detection unit 14 (step S12). Distance information between the faces detected by the face spacing detection unit 20 is sent to the synthesis position adjustment unit 22.

Next, the synthesis position adjustment unit 22 determines an arrangement of face images which is to be pasted in a template, according to the distance information detected by the face spacing detection unit 20 and template information relating to the template which is to be used (step S13).

Figure 4:
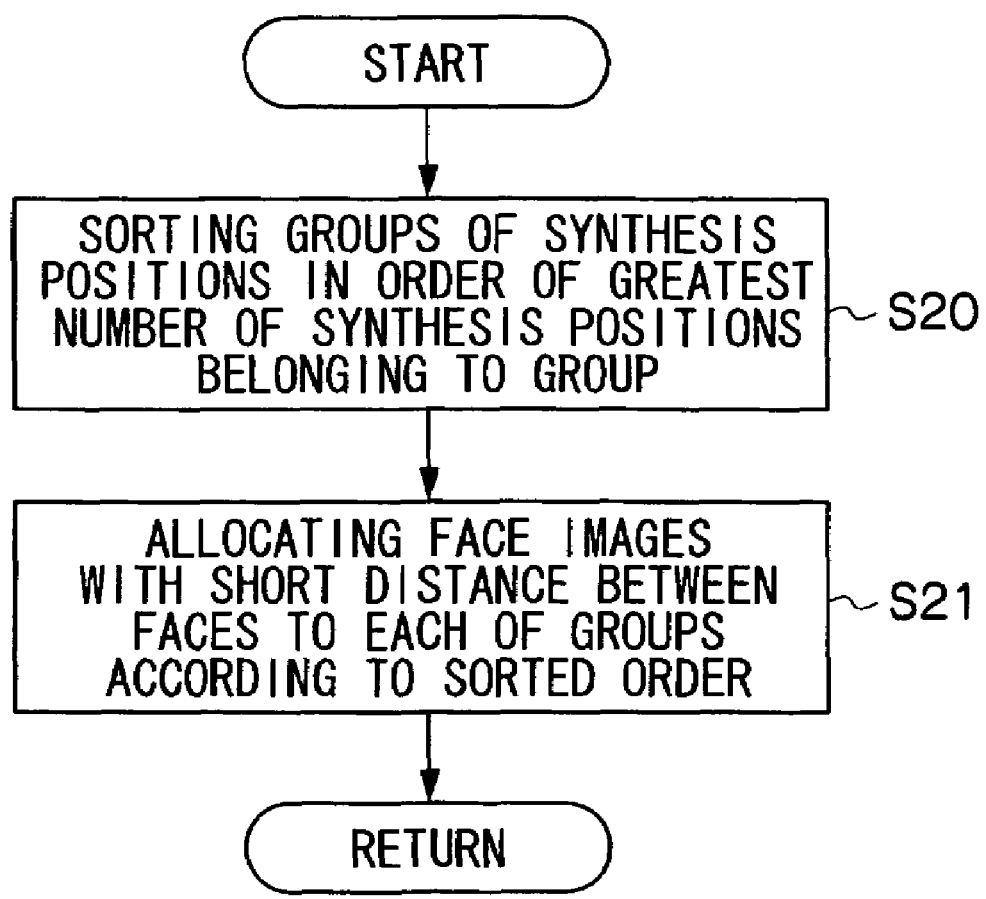
FIG. 4 is a flowchart showing a sequence of determining the arrangement of face images according to the first embodiment.
Figure 5:
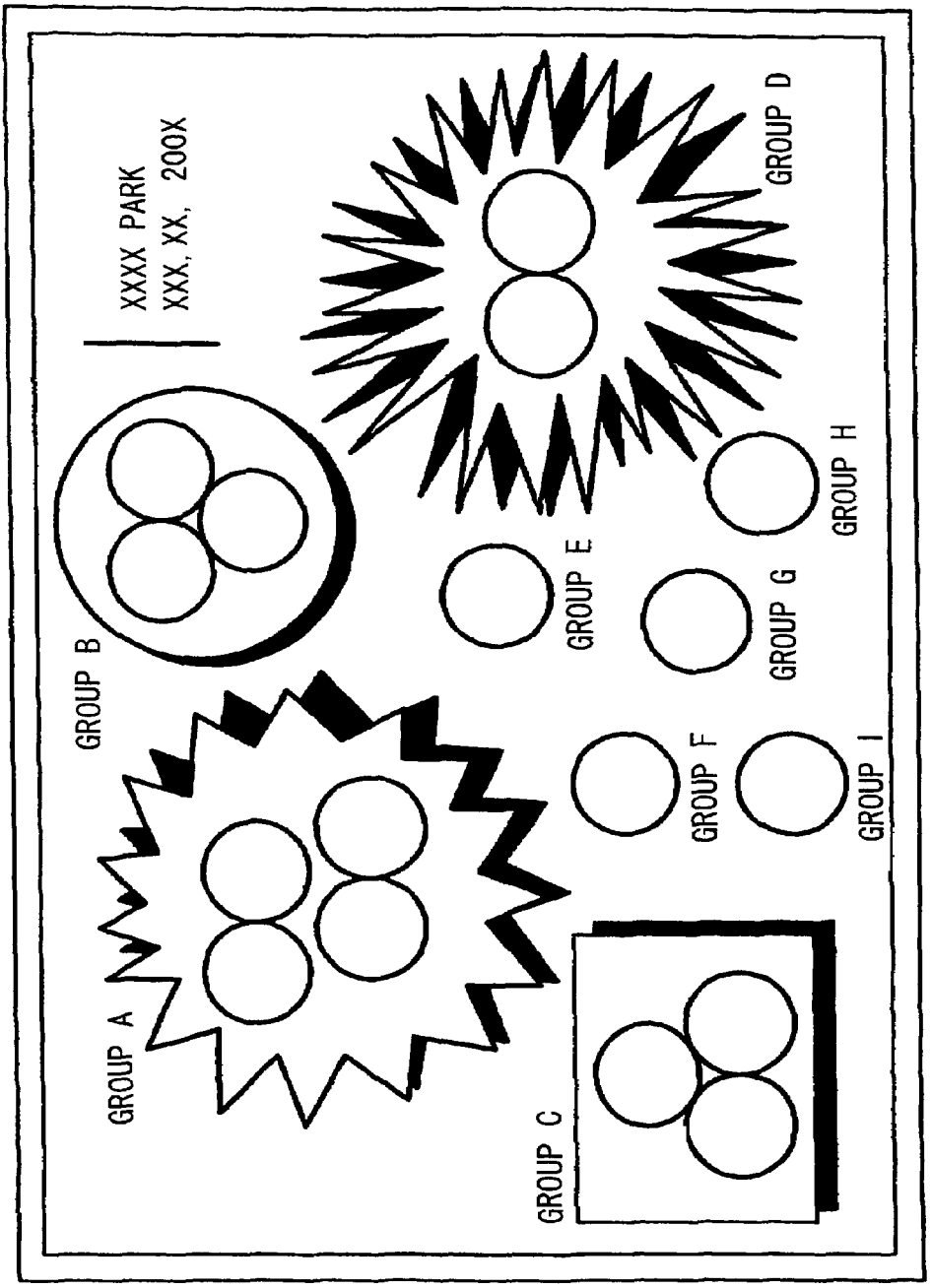
FIG. 5 is a plan view showing an example of a template according to the first embodiment.

FIG. 4 is a flowchart showing a sequence of determining the arrangement of face images. As shown in FIG. 4, first, the synthesis position adjustment unit 22 sorts the groups of synthesis positions corresponding to the number of the synthesis positions belonging to the respective groups, according to group information on the synthesis position included in the template information (step S20). For example, when a group with four synthesis positions, a group with three synthesis positions, a group with two synthesis positions, and a group with a single synthesis position are present as groups of synthesis positions, the groups of synthesis positions are sorted so that the group with four synthesis positions assumes a first place, followed by the group with three synthesis positions, group with two synthesis positions, and group with a single synthesis position. In the case of the template shown in FIG. 5, there are a group A with four synthesis positions, groups (B, C) with three synthesis positions, a group D with two synthesis positions, and groups (E, F, G, H, I) with a single synthesis position, and hence the arrangement is a following relationship: group A→groups (B, C)→group D→groups (E, F, G, H, I). In the case of the groups with the same number of synthesis positions, the groups are rearranged in order from the group with a shorter distance between the synthesis positions.

Figure 6:
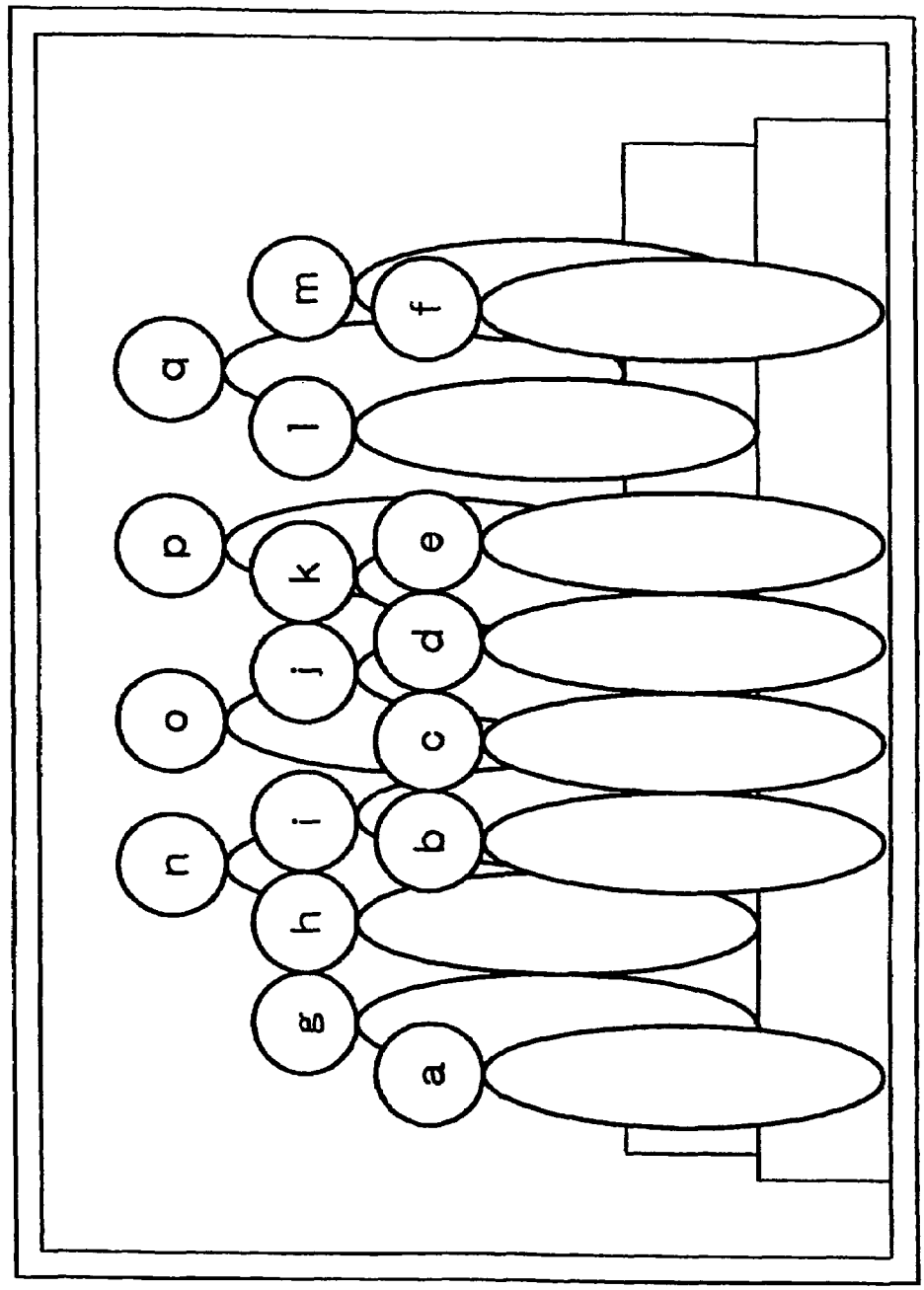
FIG. 6 is a plan view showing an example of a group photo according to the first embodiment.

Next, face images are allocated to the groups in the sorted order (step S21). At this time, the face images are allocated by combining the face images of characters with a short distance between the faces. For example, when face images of the synthesized photo shown in FIG. 6 are synthesized in the template shown in FIG. 5, the groups of synthesis positions are sorted in order of A→(B, C)→D→(E, F, G, H, I) as described above, and therefore, the allocation is started from group A. Since the four synthesis positions belong to group A, then four face images with a shortest distance between the faces are allocated. In FIG. 6, the face images (b, c, d, e) have the shortest distance between the faces. Therefore, the face images (b, c, d, e) are allocated to the group A. Next, the allocation is conducted to group B. Since the three synthesis positions belong to group B, then three face images with a shortest distance between the faces are allocated from remaining face images which have been left-hand except for the selected face images (b, c, d, e). In FIG. 6, the face images (g, h, i) are next to the face images (b, c, d, e) in terms of the shortest distance between the faces. Therefore, the face images (g, h, i) are allocated to the group B.

Then, after the face images are allocated to the groups in the sorted order, the arrangement of face images is determined, and then the determined information is outputted to the image synthesis unit 24 (return to step S14).

Next, the image synthesis unit 24 respectively cuts out the images of faces according to the image data of the synthesized photo, and pastes the cut-out face images in the synthesis positions on the template according to the determined arrangement information, so that a synthesized photo is generated (step S14). Then, the generated synthesized photo is outputted to the image output unit 26 (step S15).

The image output unit 26 outputs the synthesized photo generated by the image synthesis unit 24 to a monitor or a printer, so that the synthesized photo is played back on the monitor or printed on a photographic paper.

As described above, in the synthesized image generation apparatus 10 according to the present embodiment, characters with a short distance between the faces, which have been captured in a group photo, are synthesized as a coherent group. The characters that are on good terms with each other, such as relatives and friends, are generally captured close to each other. Therefore, by arranging the characters with a short distance between the faces so as to belong to the same group such as the present embodiment, it is possible to synthesize the photo by combining the characters that are on good terms with each other in the same group.

In the present embodiments, the adjacent characters with a short distance between the faces are combined together, but the distance values may be weighted according to the direction of the detected distance between the faces or the face size. For example, when weighting is conducted according to the direction, weighting may be conducted in the order of lateral direction, inclined direction, and longitudinal direction. When weighting is conducted according to the face size, a large weight is assigned to a distance value between a face captured in large size (face of an adult) and a face captured in small size (face of a child). The weighted distance values may be used directly or after conversion into rank values by using a table. In this way, by weighting the distance values according to the direction of the detected distance between the faces or the face size, it is possible to obtain an arrangement which is more faithful to the degree of intimacy between the characters captured in the group photo.

Furthermore, in the present embodiment, when the groups of synthesis positions is sorted, the sorting is conducted in the order of the number of synthesis positions belonging to each of the groups, but the sorting may be also conducted in the order of synthesis positions in the template. In addition, when there are adjacent face images with a short distance therebetween, the sorting may be conducted in order from a group that the position in the group photo and the position in the template are closest.

When the sorting is conducted in the order of synthesis positions belonging to each of the groups, the sorting may be conducted in the order of increasing number of synthesis group belonging to each group, in other words, in opposite order to the embodiment described above. When the numbers of synthesis positions are the same, the setting may be conducted in order from a group with a shortest distance between the synthesis positions, in consideration of the distance between the synthesis positions within the group.

Moreover, in the present embodiment, synthesis positions are grouped, and then characters with a short distance between the faces in each of the groups are combined and allocated. However, a method may be also adopted in which the characters with a short distance between the faces are initially combined and grouped, and then the face image of each of the characters is allocated onto the template so that the face images of each character belonging to the same group are arranged in close synthesis positions. In this case, it is preferable that the groups are sorted according to the number of faces belonging to a group so that groups of the synthesis positions which have been set on the template are allocated in the sorted order.

Second Embodiment

Next, a synthesized image generation apparatus according to a second embodiment of the present invention will be described below.

In the synthesized image generation apparatus according to the second embodiment, when group photos are separately captured twice, a movement direction and a movement amount of each of face images in the group photos are measured, the face images are grouped according to a concentration degree of movement directions of face images moved through a fixed distance, and synthesis is conducted so that the group is arranged coherently on the template.

Figure 7:
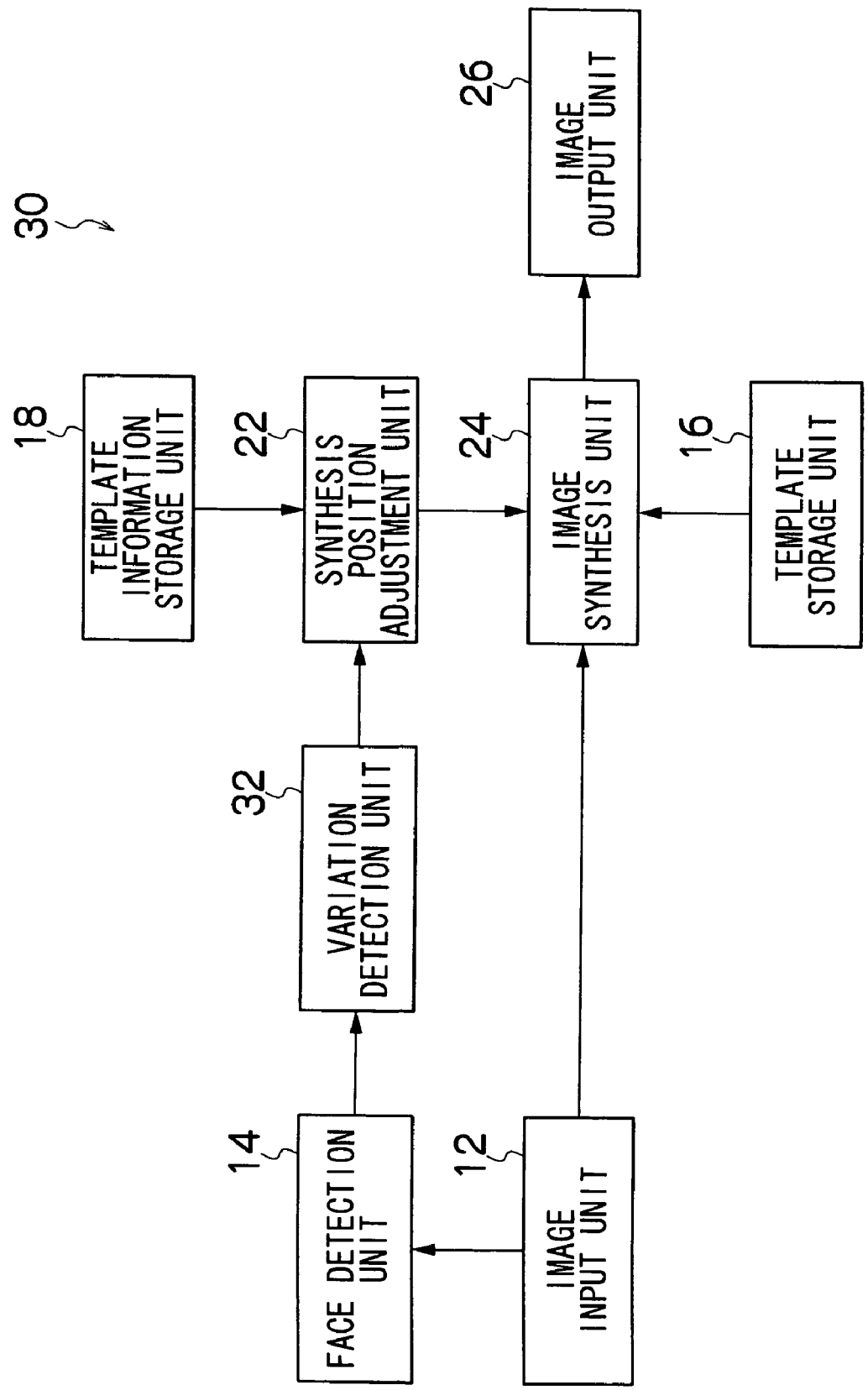
FIG. 7 is a block diagram showing the configuration of a synthesized image generation apparatus according to a second embodiment of the present invention.

FIG. 7 is a block diagram showing the configuration of a synthesized image generation apparatus 30 according to the second embodiment. As shown in FIG. 7, in the synthesized image generation apparatus 30 according to the second embodiment, a variation detection unit 32 is provided instead of the face spacing detection unit 20 in the synthesized image generation apparatus 10 according to the first embodiment. All other components are identical to those of the synthesized image generation apparatus 10 according to the first embodiment. Therefore, structural elements identical to those of the synthesized image generation apparatus 10 in the first embodiment are assigned with the same reference symbols, and then description thereof is omitted here.

The variation detection unit 32 detects the movement amount and the movement direction of each of the face images from the face positions in two group photos detected by the face detection unit 14. More specifically, according to position information of the face images of characters detected from the first and second group photos, the movement direction and movement distance of the face positions of characters are detected during second capturing cycle with respect to the first capturing cycle. Movement amount information and movement direction information of the face images of characters which are detected by the variation detection unit 32 are sent to the synthesis position adjustment unit 22. The synthesis position adjustment unit 22 determines the arrangement of face images to be pasted on the template according to the template information, the movement amount information, and the movement direction information.

Figure 8:
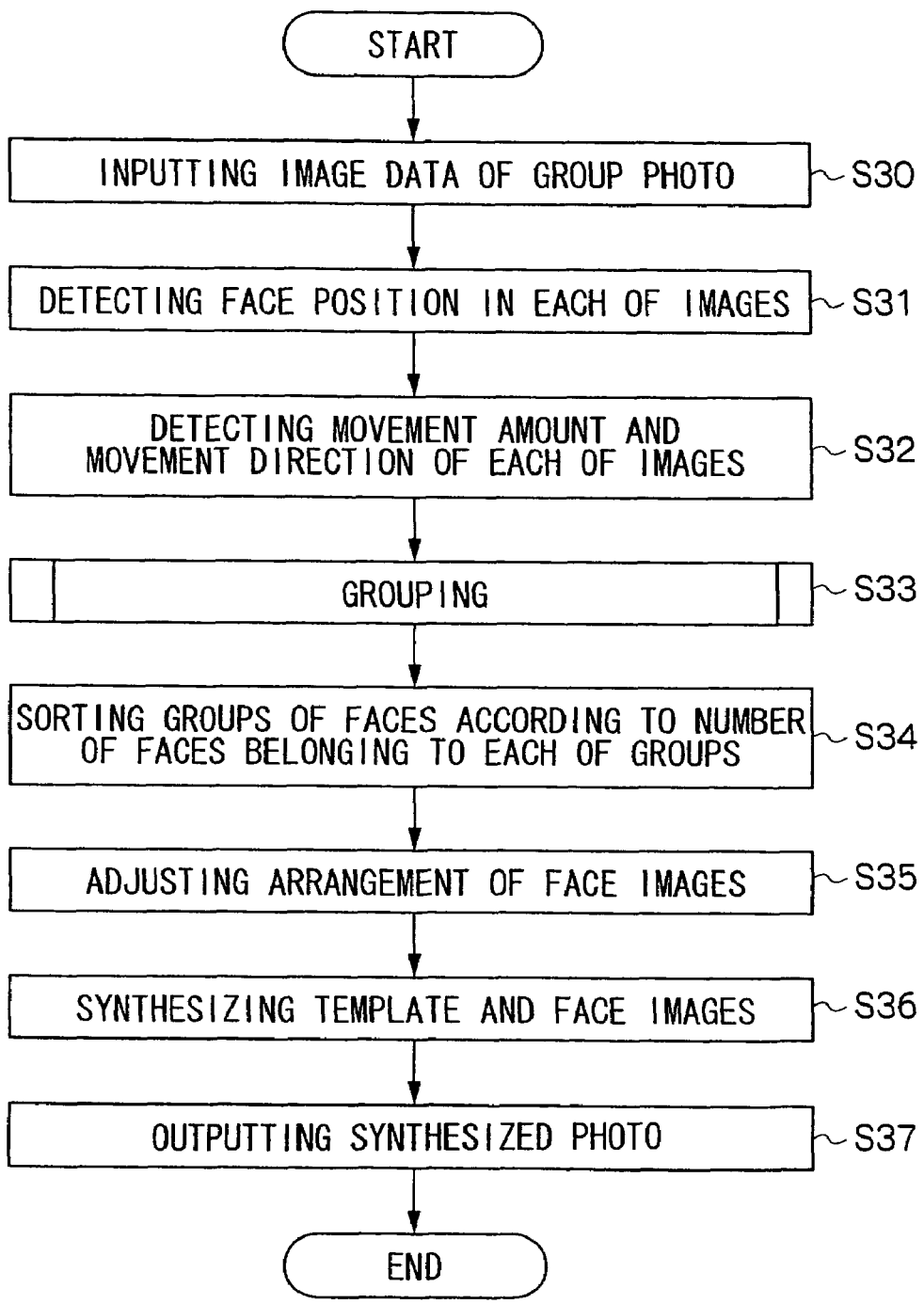
FIG. 8 is a flowchart showing a sequence of generating a synthesized photo in the synthesized image generation apparatus according to the second embodiment.

FIG. 8 is a flowchart showing a sequence of generating a synthesized photo in the synthesized image generation apparatus 30 according to the second embodiment.

First, image data of two group photos used for image synthesis are inputted into the image input unit 12 (step S30).

Incidentally, since the synthesized image generation apparatus 30 in the present embodiment uses two group photos, then the group photo is captured twice for image synthesis. In this case, the picture is preferably captured in a formal row arrangement at first time, and the picture is preferably captured in a friendly arrangement at the second time.

The two types of group image data inputted from the image input unit 12 are supplied to the face detection unit 14, and the positions of faces captured in each of the group images are detected separately (step S31).

The position information of the faces in each of the group images detected by the face detection unit 14 is supplied to a variation detection unit 32, and the variation detection unit 32 detects the movement amount and movement direction of each of the faces from the position information of the face position of each of the faces in each of the images which are detected by the face detection unit 14 (step S3). In other words, the movement direction and the movement amount of each of the faces in the second photo are detected with respect to the first photo.

The movement amount information and the movement direction information of each of the faces detected by the variation detection unit 32 is supplied to the synthesis position adjustment unit 22, and then the face images are grouped by the synthesis position adjustment unit 22, according to the movement amount information and the movement direction information of each face detected by the variation detection unit 32 (step S33).

Figure 9:
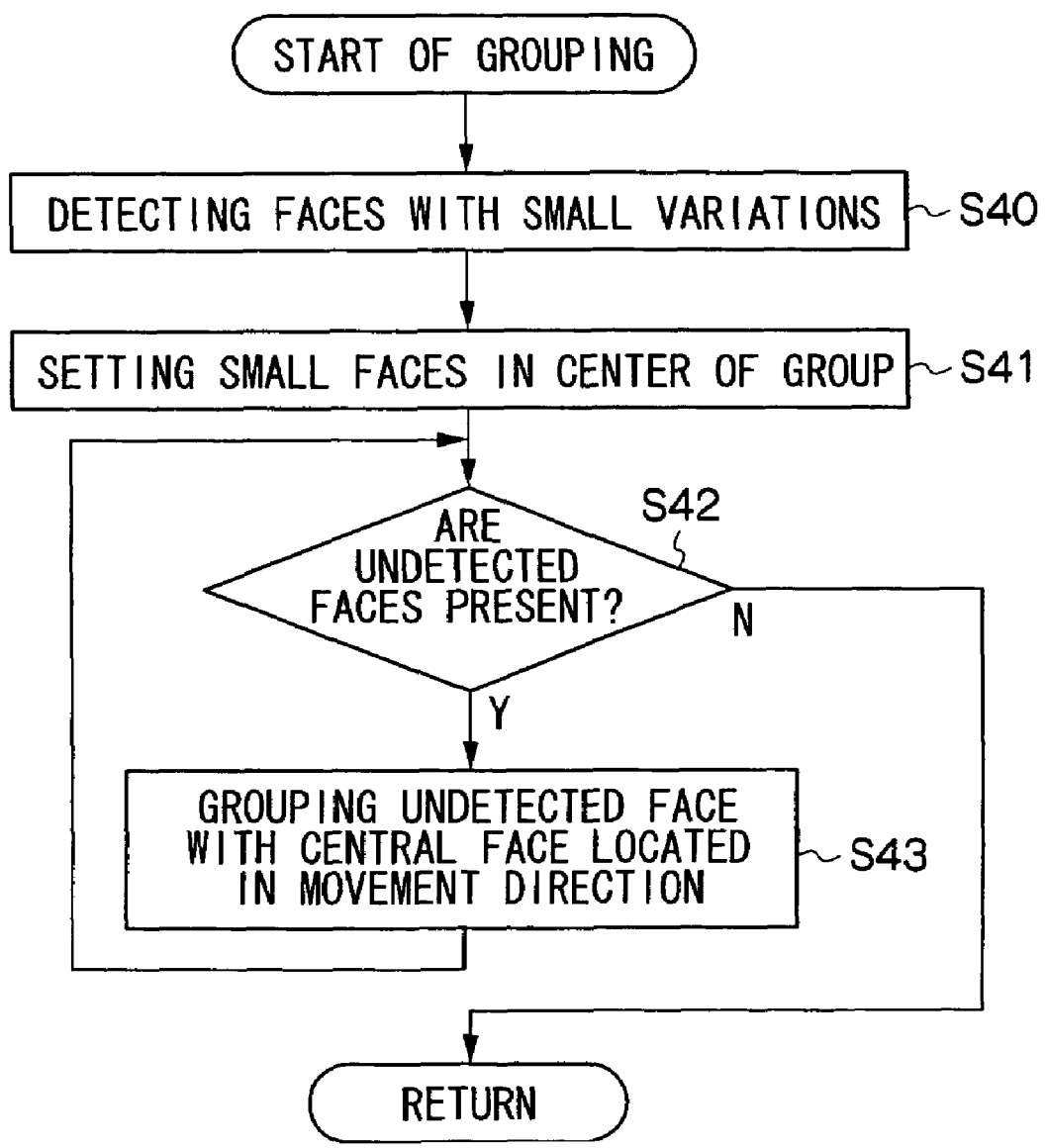
FIG. 9 is a flowchart showing a sequence of forming groups of face images according to the second embodiment.

FIG. 9 is a flowchart showing a sequence of forming groups of the face images according to the second embodiment.

Figure 10:
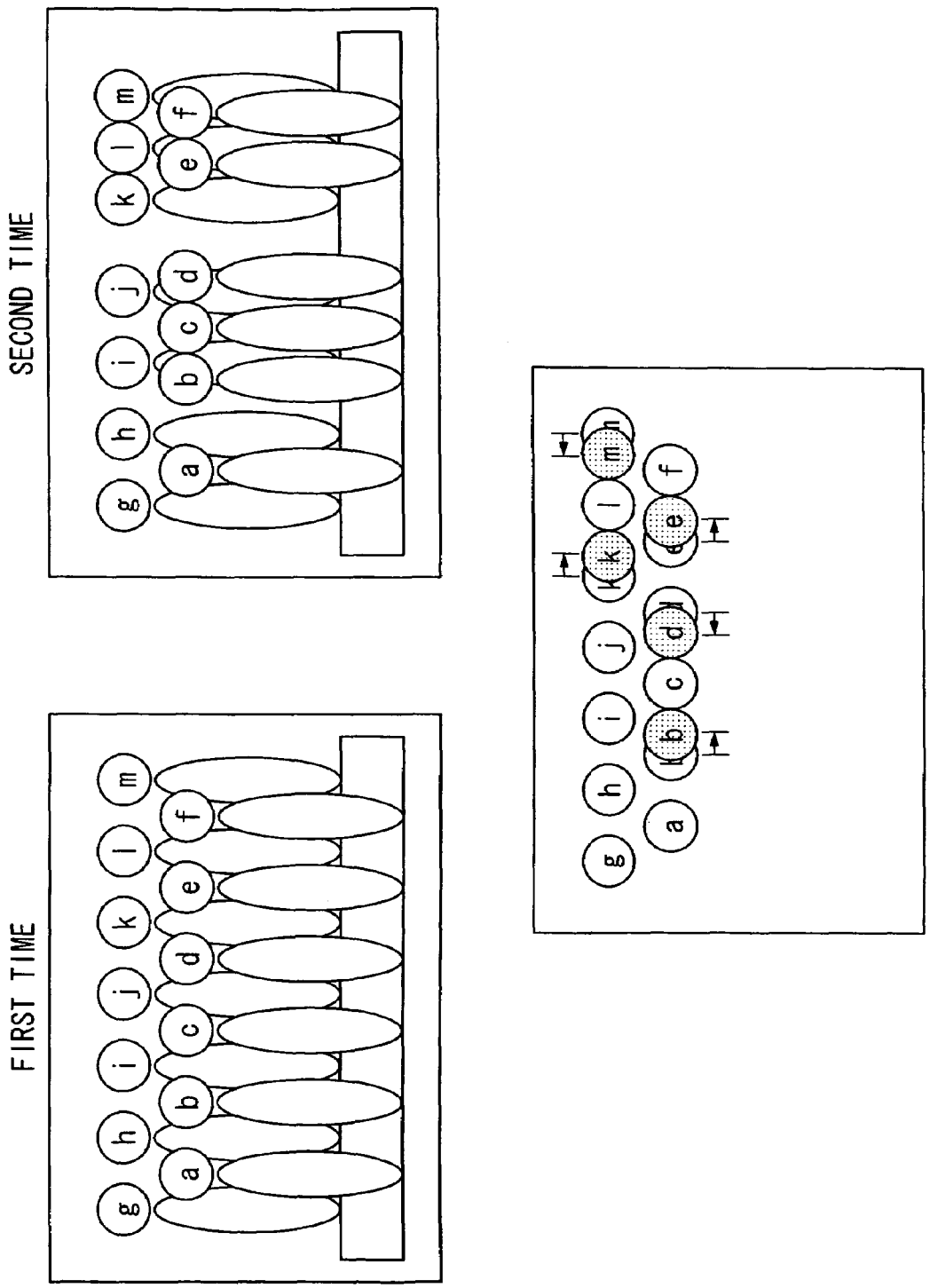
FIG. 10 is a plan view showing an example of a group photo according to the second embodiment.

First, a face with a small movement amount is checked according to the information on the detected movement amount of each face (step S40). More specifically, a face for which the movement amount is less than the preset threshold is checked. Next, the checked face is set in the center of the group (step S41). For example, as shown in FIG. 10, when a group photo of thirteenth characters is captured twice, the movement amount of characters (a, c, f, g, h, i, j, l) is small. Therefore, the characters (a, c, f, g, h, i, j, l) are checked, and then the positions of faces thereof are set in the center of the groups.

Next, it is decided whether or not an unchecked face is present (step S42). In other words, it is decided whether or nor a face with a movement amount equal to or larger than the threshold is present. At this time, if an unchecked face is determined to be present, this face is grouped with the central face located in the movement direction thereof according to the movement direction of the unchecked face and the position information prior to the movement (step S43). For example, as shown in FIG. 10, since the face images of characters (b, d, e, k, m) are unchecked faces, the face images of characters (b, d, e, k, m) are grouped. In this case, for example, with respect to the character b, there is a face of the character c in the movement direction thereof. Therefore, the face of the character c is grouped so as to be set in the center. Furthermore, with respect to the character d, there is also a face of the character c in the movement direction thereof. Therefore, the face of the character c is grouped so as to be set in the center. Moreover, with respect to the character e, there is a face of the character f in the movement direction thereof.

Therefore, the face of the character f is grouped so as to be set in the center. In this way, forming groups of the unchecked faces is conducted with the central face located in the movement direction thereof, according to the movement direction of the unchecked faces and the position information prior to the movement (step S43).

Consequently, in the example shown in FIG. 10, the face images of characters (b, c, d) and (k, l, m) are set in groups of three characters, and the face images of characters (e, f) are set in groups of two characters. Furthermore, each of characters (a, g, h, i, j) is set in an individual group.

Incidentally, when a face of character in the movement direction thereof is not present, the face is set in the individual group even if the movement amount is equal to or larger than the threshold value.

Once grouping has been conducted in this manner described above, and unchecked faces have disappeared, the grouping process is completed (return to step S34). Then, the groups are sorted according to the number of faces belonging to each of the groups (step S34).

As shown in FIG. 10, the group (b, c, d) and group (k, l, m) have three component, group (e, f) has two components, and groups (a, g, h, i, j) have one component. Therefore, sorting is conducted in the following order: group (b, c, d)→group (k, l, and m)→group (e, f)→group (a)→group (g)→group (h)→group (i)→group (j).

Next, each of the face groups is allocated in the sorted order to synthesis positions set in the template, according to the template information stored by the template information storage unit 18 (step S35). More specifically, for example, a group in which the number of faces is three is allocated to a group with three fixed synthesis positions, and a group in which the number of faces is two is allocated to a group with two fixed synthesis positions. In this way, the arrangement of face images is adjusted so that each of the face groups is matched with a group with the same number of synthesis positions. Then, the determined arrangement information of the face images is outputted to the image synthesis unit 24.

Then, the image synthesis unit 24 cuts out each of the face images from the image data of the two group photos, and pastes the cut-out face images to the synthesis positions on the template according to the determined arrangement information, thereby generating a synthesized photo (step S36). The generated synthesized photo is then outputted to the image output unit 26 (step S37).

The image output unit 26 outputs the synthesized photo generated in the image synthesis unit 24 to a monitor or a printer, and the outputted synthesized photo is played back on the monitor or is printed on a photographic paper.

Thus, in the synthesized image generation apparatus 30 of the present embodiment, the movement direction and movement amount of each of the face images in a group photo which has been captured twice are measured, the face images are grouped according to the concentration degree of movement directions of face images which are moved through the fixed distance or further, and then the groups are combined and synthesized so as to be arranged on a template. Therefore, it is possible to synthesize the photo by combining the face images of the characters that are on good terms with each other in the same group.

Incidentally, in the present embodiment, the face images that are to be pasted in a template are cut out from the images of the second group photo, but may be also cut out for pasting form the images of the first group photo, or may be cut out for pasting from the images of both group photos.

The face images may be also cut out from the images of each of the group photos, and two synthesized photos may be generated. When two synthesized photos are generated, different templates may be used. On the other hand, when the same template is used, the synthesis positions may be changed.

Furthermore, in the present embodiment, when the groups of face images were sorted, the sorting was conducted in order of increasing number of face images of characters belonging to a group, but may be also conducted in order of decreasing number. In this case in which the sorting is conducted in order of increasing number of face images of characters belonging to a group, when the number of face images of characters belonging to each group is the same, then the setting may be conducted in order from the group with a shortest distance, in consideration of the distance between the face images of characters belonging to each of the group.

Moreover, the two group photos used for the synthesis are not necessarily required to be captured continuously, and any two photos in a plurality of photos which have been captured may be selected and used. For example, when five photos have been captured, the first photo and third photo may be used, or the second photo and fifth photo may be used.

Third Embodiment

In the present embodiment, an example of synthesizing movie image data with a template will be described. The configuration of the present embodiment is almost identical to the configuration of the first embodiment described above. Therefore, components identical to those of the first embodiment will be assigned with identical symbols, and then the description thereof will be omitted here.

Figure 11:
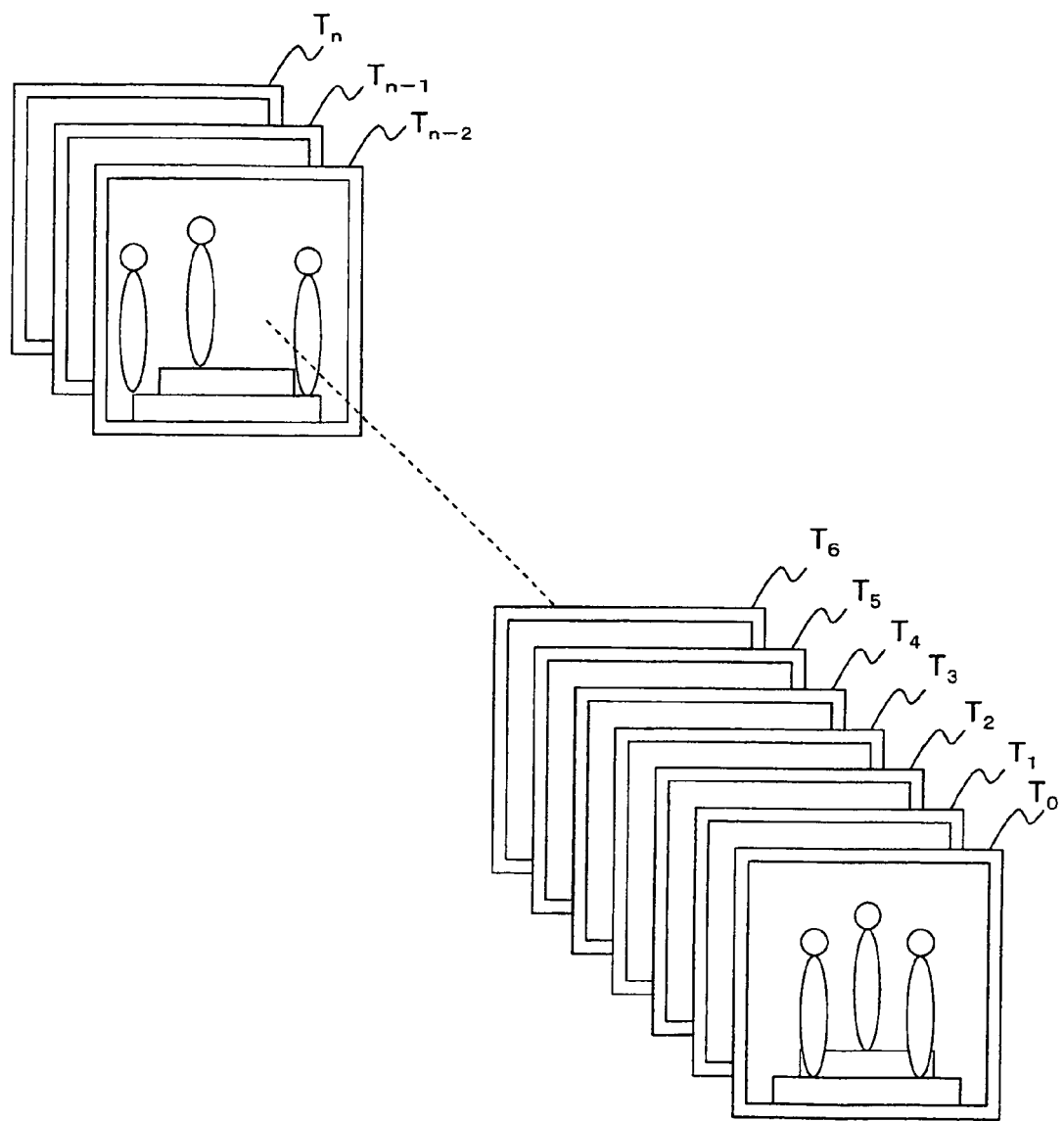
FIG. 11 is a diagram of movies comprising a plurality of image data, showing an applied example according to the present invention.

FIG. 11 showing an applied example according to the present invention, showing an example of using movies comprising a plurality of image data. Generally, in a movie, a plurality of image data captured over a certain period with the prescribed spacing in time are displayed continuously in the order of shooting sequence. In the movie shown in FIG. 11, (n+1) image data captured at a plurality of times $T_0$ to $T_n$ are displayed continuously from image data corresponding to a time $T_0$ to image data corresponding to a time $T_n$. In a movie which is composed of such a plurality of image data, as similar to the first embodiment described above, synthesized image data can be also generated by synthesizing the face images extracted from each of the image data with a template. Incidentally, a method of synthesizing the face images with the template is almost identical to that of the first embodiment described above.

When synthesized image data is generated according to the movie shown in FIG. 11, single synthesized image data can be generated by selecting one specific image data as an object from a plurality of image data which constitutes the movie and synthesizes the face image captured in this object image data with one template. Furthermore, a plurality of synthesis image data can be generated by selecting a plurality of image data representing all of the image data which constitutes the movie or part thereof and synthesizes the face images captured in the object image data with one or a plurality of templates. In particular, if a plurality of templates are used, the template to be synthesized the face image can be changed according to the capturing times $T_0$ to $T_n$ of the image data.

When a simple template and a plurality of image data constituting a movie are selected as the synthesis objects, a new movie in which the face images change with time on the template can be generated by assembling a plurality of generated synthesized image data over time.

Therefore, since a movie comprising a plurality of image data is selected as an object of synthesized image data, then it is possible to generate one synthesized image data; a plurality of synthesized image data; synthesized image data of static images; and synthesized image data of a movie, thereby improving the degree of freedom in generating synthesized image data.

Fourth Embodiment

In a fourth embodiment, an example of generating slide show by combining synthesized image data and non-synthesized image data will be described. Herein, the term "slide show" indicates a process of successively playing back a plurality of image data with the prescribed time intervals. Incidentally, a prescribed music may be accompanied during playback. The prescribed time interval during playback may be constant or not constant. The configuration of the present embodiment is almost identical to that of the first embodiment described above. Therefore, components identical to those of the first embodiment will be assigned with identical symbols, and then the description thereof will be omitted here.

In the present embodiment, the synthesized image generation apparatus and synthesized image generation method according to first embodiment described above are used to generate synthesized image data, and an image synthesis unit 24 generates an image which is set by arranging the synthesized image data and non-synthesized image data in order of playback. The generated image set is written onto a hard disk, a CD, a DVD, a flash memory, or other computer-readable medium by the image output unit 26. Each of image data in the image set is successively played back in order of the playback by the image output unit 26 or by the image output unit 26 in cooperation with other devices.

The synthesized image data generated in the present embodiment are generated by synthesizing a single image data or a plurality of image data with a single template or a plurality of templates. In particular, when the synthesized image data is generated according to a plurality of image data, for example, it is possible: (1) to generate synthesized image data of all of the image data; (2) to generate synthesized image data of image data for each of prescribed order according to the order of playing back the slide show; (3) to generate synthesized image data of designated image data, and (4) to generate synthesized image data of image data which is specified according to the music accompanying during slide show.

Figure 12:
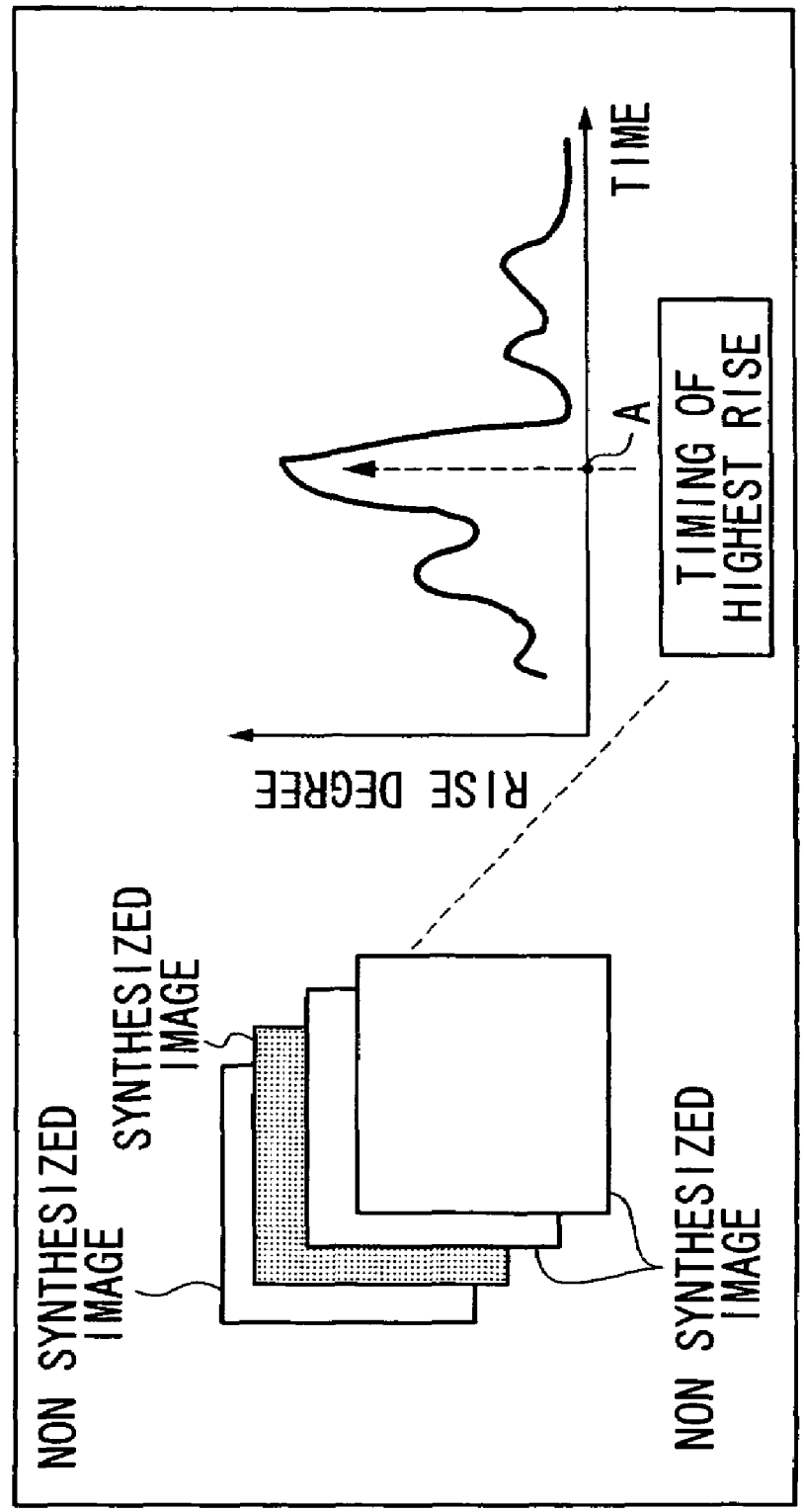
FIG. 12 is a diagram showing an example in the case in which synthesized image data used for slide show is generated according to music playing data during the slide show.

FIG. 12 shows an example in the case in which the synthesized image data used for the slide show is generated according to the music accompanying the slide show. The left side in FIG. 12 shows an order in which a plurality of image data of an image set are played back, and the right side in FIG. 12 shows the relationship between the music rising degree (ordinate) and time (abscissa). Herein, the term "music rising degree" is set according to any element (for example, according to musical elements such as musical interval, sound volume, tempo, and simplicity, or according to senses of a specific character). Furthermore, the timing of the highest rise of music may be also set according to any element. For example, a musical interval, a sound volume, and tempo may be converted into frequency components, and then peak points of the elements converted into frequency components may be considered as "the timing of the highest rise of music". Furthermore, in an example shown in FIG. 12, the synthesized image in which a template have been used (see toned portion in FIG. 12) are played back at the timing of the highest rise of music (see "A" in FIG. 12), thereby making the slide show even more interesting.

When the image data serving as an object of the synthesized image data have been determined in advance, synthesized image data may be generated by those image data and a template, and then the synthesized image data and non-synthesized image data may be combined in order of playback. Furthermore, the non-synthesized image data may be arranged in order of playback prior to generating the synthesized image data, synthesized image data may be generated by part or all the arranged non-synthesized image data, and then the synthesized image data generated in this manner may be inserted to the playback sequence of non-synthesized image data serving as the base.

In the present embodiment, the example is described in which an image set is composed of a plurality of image data combining synthesized image data and non-synthesized image data, but an image set may be also composed only of synthesized image data.

Furthermore, an image set comprising synthesized image data can be used for applications other than the slide show. For example, the synthesized image data of an image set can be used not only so that single image data is successively played back as slide show, but also so that a plurality of image data are displayed at the same time as an album.

Furthermore, the desired template can be appropriately used. For example, in the case of the slide show, the desired template may be used for every image. In the case of an album, a template may be used for every page synthesizing a plurality of image data which are played back at the same time.

Furthermore, any other music can be used for playback together with a slide show or an album. For example, music associated in advance with a template can be used, or the desired music selected to the user's taste can be used. Such musical data may be stored in a storage unit together with various data of the pertinent template, or may be stored in a separate storage unit.

The present invention is not limited to the above-described embodiments and modification examples thereof. A variety of changes such as design alterations can be made based on the knowledge of those skilled in the art. The embodiments incorporating such changes can be also included in the scope of the present invention.

For example, in the synthesized image generation apparatus according to the first and second embodiments described above, since the faces captured in the group photo can be detected, then it is also possible to calculate the number of faces so that the order data is used for the generated synthesized photo. For example, when face images of nine characters are detected from the image data of the group photo, automatic printing may be conducted by setting the number of prints of the synthesized photo to nine.

In the synthesized image generation apparatus according to the first and second embodiments described above, the number of groups can be also detected. Therefore, the order data for photo prints may be also set in group units. For example, when three groups are detected from the image data of a group photo, automatic printing may be conducted by setting the number of prints of the synthesized photo to three. For example, when a family photo is captured, one print is usually sufficient for one family. Therefore, it is possible to prevent unnecessary printing.

In the foregoing embodiments, examples are described in which a special synthesized image generation apparatus is used, but the synthesized image generation apparatus may be composed of a usual computer (for example, a personal computer). More specifically, the synthesized photo generation program according to the present invention may be installed on a usual computer, and then the function of the synthesized image generation apparatus of the above-described embodiments may be realized in the computer.

In the foregoing embodiments, examples are described in which the template data and template information are stored in separate storage units so as to be managed separately, but the present invention is not limited to this configuration. For example, the template information may be associated in advance with template data as "collateral information of template data", and the template data and template information may be stored in a single storage unit. In this case, the template data and template information can be easily managed, and the associated template data and template information can be called out by simple processing.

Furthermore, the face image to be synthesized may be adjusted according to the size of the synthesis position of the template. For example, when the synthesis position adjustment unit 22 determines the arrangement of face images which are to be synthesized with a template, the template and face images can be synthesized in a natural state by normalizing the size of the face image of the synthesis object according to the size of the synthesis positions to be arranged. The following methods are considered for adjusting the face images. For example, this consideration is: (I) a method of setting the side of the face image to be adjusted (also referred to hereinbelow as "face image standard size") for each template so that the face image to be synthesized is matched with the standard size thereof; and (II) a method of setting a standard size of face image for each of the synthesis positions so that the face image to be synthesized is matched with this standard size. Therefore, for example, in the case of generating synthesis image data according to a plurality of image data, synthesis image data in the natural state can be obtained even when the sizes of a plurality of face images to be synthesized are not uniform. Incidentally, when the standard size of face image differs for each of the synthesis positions, the standard size of face image in each of the synthesis positions and the size of face images prior to adjustment may be compared to determine the compatibility to each other. In this case, the arrangement of the face images on the template can be determined according to the compatibility to each other, or the compatibility to each other can be used as a weight element controlling the arrangement of face images on the template.

It is preferable to adjust color (e.g., hue, tone, saturation, and/or brightness) of face image to be synthesized for each of templates or each of synthesis positions by using image processing such as the so-called set-up processing. For example, when the image synthesis unit 24 synthesizes a face image with a template, it is preferable to adjust color of the face image according to a theme established for each of the templates or a theme established for each of the synthesis positions. More specifically, for example, when a template for summer is used, a desired color is set in advance for each of templates or each of synthesis positions so that color of the face images to be arranged in all of the synthesis positions or only a specific synthesis position is adjusted to a suntanned face color, and color of the face images arranged in the synthesis positions are adjusted to the desired color. Therefore, since synthesis image data matching the theme of the template or the theme of the synthesis position can be obtained, then more interesting synthesis image data can be generated. Incidentally, the theme can be selected appropriately according to the season, time, and location, and then also can be stored as a template auxiliary information together with the template data in the storage unit. In addition, it is also possible to partially adjust color of face images. For example, only the face color or head hair color can be changed.

The inclination of the face image to be synthesized may be adjusted for each of templates or each of synthesis positions. For example, when the synthesis position adjustment unit 22 determines the arrangement of face images to be synthesized in a template, the inclination of face images to be synthesized is adjusted according to the synthesis positions, thereby adequately synthesizing the face images with the template. More specifically, for example, when the target value of the "inclination of face image" to be synthesized can be set for each of templates or each of synthesis positions, the inclination of the face image to be synthesized can be adjusted according to this target value. Therefore, the face images can be adequately arranged on the template.

In the foregoing embodiments, examples are described in which the measured discharge is weighted according to the direction of the face or size of the face of the character to be measured, but the relationship between the face images may be also weighted according to other elements. For example, characters who are on good terms with each other are assumed to most often face each other. Accordingly, weighting can be conducted so as to group together the face images of characters that chase each other. More specifically, for example, when the synthesis position adjustment unit 22 decides that the characters that the faces each other form a group of characters that are on good terms with each other, the corresponding face images are disposed close to each other, thereby weighting according to the measured distance or determining the synthesis positions. Incidentally, "the characters that face each other" may be determined according to the direction of face images, for example.

Figure 13:
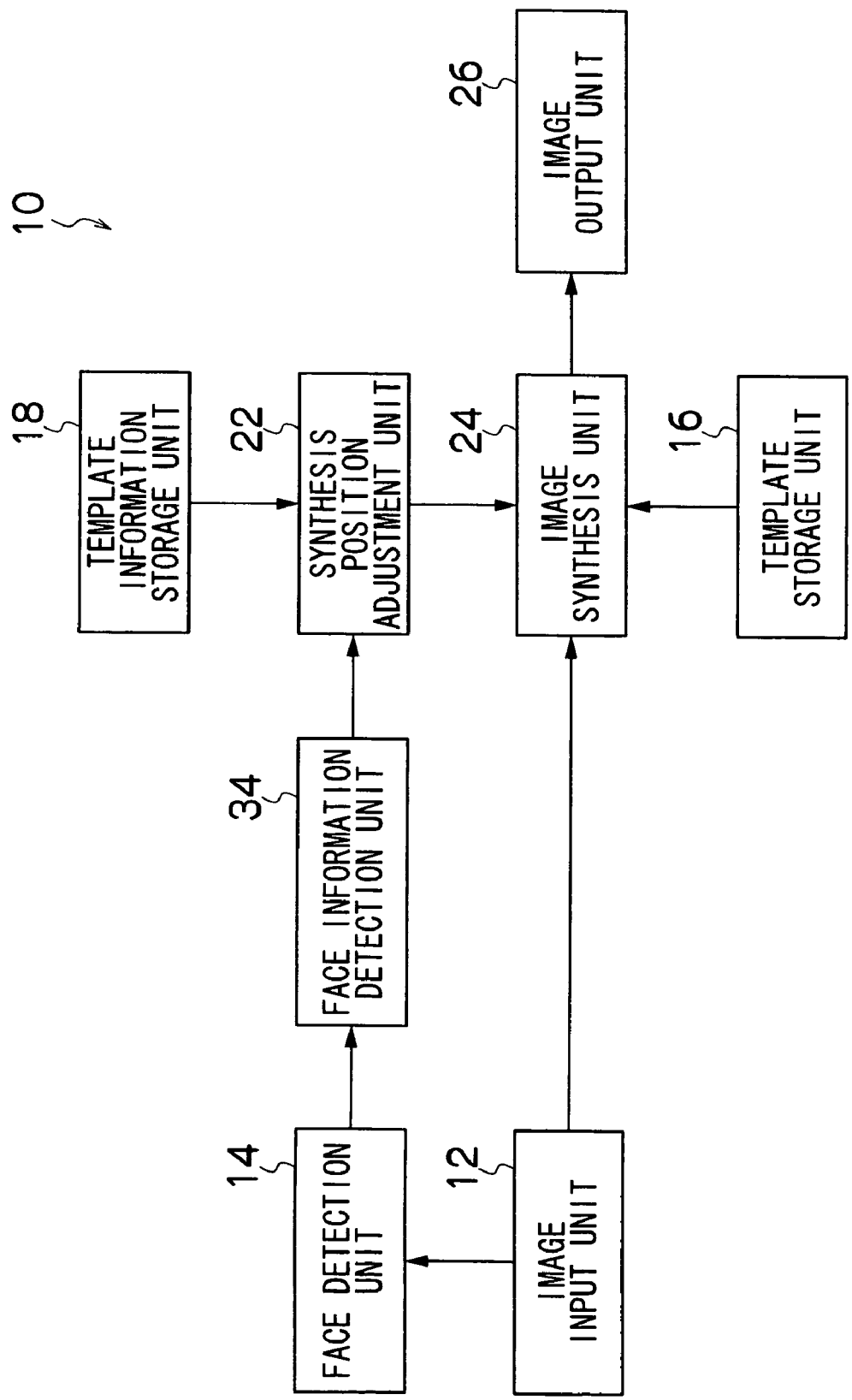
FIG. 13 is a block diagram showing a modification example of the configuration of the synthesized image generation apparatus according to the second embodiment.

Furthermore, according to the facial expression of the face images of characters to be measured, the measured distance may be weighted or the synthesis positions may be determined. FIG. 13 is a block diagram showing a modification example of the synthesized image generation apparatus according to the first embodiment. In the present modification example, a face information detection unit 34 which detects the facial information is provided in place of the face spacing detection unit 20 shown in FIG. 1. The face information detection unit 34 detects the facial expression of face images of the characters to be measured by a well-known facial expression recognition image method, and the grouping or weighting of the measured distances is conducted so that the face images are arranged close to each other for each of the detected facial expressions. Then, the synthesis position adjustment unit 22 determines the synthesis positions of face images on the template according to the detection results by the face information detection unit 34. Therefore, multiple smiling face images and multiple surprised face images can be arranged close to each other on the template. Furthermore, grouping according to facial expressions may be combined with grouping according to other elements. For example, the face images may be grouped according to the detected facial expression of the face images, and then the face images in each of the groups obtained by this grouping may be weighted according to the distance, thereby determining synthesis positions of face images. Any suitable methods can be used as facial expression recognition methods. For example, well-known methods disclosed in Japanese Patent Application Publication Nos. 2005-149302 and 2005-044330 can be used as facial expression recognition methods can be adopted. Japanese Patent Application Publication No. 2005-149302 discloses a face image recognition apparatus and a face image recognition program. In the face image recognition apparatus and the face image recognition program, the character ID and feature arrangement information of registered face images to be registered in advance are registered as a face template in accordance with the registered face image, and then the face change information is extracted according to the feature point arrangement information of face images with different facial expressions. Therefore, a character with the face image contained in the image can be specified according to the face template and face change information. Furthermore, Japanese Patent Application Publication No. 2005-044330 discloses a facial expression recognition method that a face feature is extracted by filtering a detected face image with a Gabor filter, and that the facial expression of the detected face image is recognized according to the extracted face feature. Additionally, in Japanese Patent Application Publication No. 2005-044330, a facial expression recognition method is also disclosed in which the facial expression of detected face image is recognized by using a data set for facial expression learning which is composed of: a plurality of face images having specific facial expressions serving as recognition objects; and a plurality of face images having facial expressions which are different from the aforementioned specific facial expressions. In those facial expression recognition methods, the face image having a specific facial expression is identified from the detected face images according to the face features extracted with the Gabor filter from the data set for facial expression learning. In addition, an apparatus for implementing this facial expression recognition method comprises a facial expression identification device which identifies the face image having the specific facial expression serving as a recognition object from the detected face images. This facial expression identification device may be adapted to a support vector machine (SVM) which identifies whether or not the face feature extracted by the aforementioned face feature extraction device is the specific facial expression, by using the support vector which has been learned in advance. Furthermore, the facial expression identification device may comprise: an assumption result output device which includes a plurality of weak hypotheses; and a discrimination device which discriminates whether or not the detected face image is a specific facial expression according to assumption results outputted by an assumption result output device. The assumption result output device may assume whether or not the detected face image is a specific facial expression according to the feature quantities which have been learned in advance, so as to output the assumption results to each of a plurality of weak hypothesis. On the other hand, the discrimination device may add the assumption results of weak hypotheses to the credibility degree which has been learned according to the assumption performance of the weak hypotheses for each output of the assumption results of one weak hypotheses, so as to discriminate whether or not the face image is a specific facial expression according to the addition results. Moreover, an apparatus for implementing the above-described facial expression recognition method may comprise: a plurality of facial expression identification devices which identify face images having a specific facial expression; and a facial expression determination device which determines facial expression of the detected face image according to the identification results obtained by the facial expression identification devices. The facial expression determination device may also determine the facial expression of face image according to the addition results by each of the facial expression identification devices. In addition, the facial expression identification device may also be a support vector machine (SVM) which identifies whether or not the face feature extracted with the aforementioned face feature extraction device is the specific facial expression, by using the support vector which has been learned in advance. In this case, the support vector may be learned in advance according to the extracted face features. In other words, weak hypothesis is repeatedly generated according to the filtering results obtained with one Gabor filter selected from a plurality of Gabor filters, by using the data set for facial expression learning which is composed of: a plurality of face images demonstrating specific facial expressions serving as recognition objects; and a plurality of face images demonstrating facial expressions which are different from the aforementioned specific facial expressions. Since it is possible to assume whether or not the given face image is a specific facial expression by using the generated weak hypotheses, face features are extracted from a data set for facial expression learning with all of the Gabor filters selected as weak hypotheses.

Incidentally, a program for implementing the above-described procedure for generating synthesized image data in a computer can be also included into the scope of the present invention.

The method for forming groups of the face images is not limited to the above-described procedure. For example, the grouping can be also simply conducted according to the frequency of appearance (presence) in a photograph (image data), and the characters with a high frequency of appearance can be grouped in the same group. In addition, even if they are the image faces that escaped from the high-order group in grouping process, the image faces with a high frequency of appearance (presence) in a photograph (image data) may be synthesized in specific locations which have been designated in advance on the template. Such specific locations designated on the template can be appropriately determined according to a theme of the template, and the like. For example, conspicuous positions can be captured as the specific locations.

Furthermore, the criteria of forming groups of the face images are not limited to the above-described procedure. For example, since persons who are on good terms with each other most often keep together during photographing, then the frequency of capturing (present) the characters together in a photo (image data) may be one of the criteria for forming groups of the face images. In this case, the face images and template can be synthesized so that the frequency of capturing is determined according to the distance between the arranged face images. In other words, the higher is the frequency, the closer to each other the face images are arranged.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A computer readable storage medium having embodied thereon a computer program for causing a computer to execute a synthesized image generation method for generating synthesized image data by extracting face images of characters contained in image data and synthesizing the extracted face images with a template into a plurality of synthesis positions which have been set in advance on the template, the program comprising the steps of:

forming groups of the synthesis positions by combining the adjacent synthesis positions;

determining an order of the groups according to number of synthesis positions belonging to each of the groups;

detecting the face images of the characters contained in the image data;

detecting a relationship between the detected face images;

distributing the face images to the groups in the determined order according to the relationship between the face images; and generating the synthesized image data by synthesizing the distributed face images with the template into the synthesis positions of the groups.

2. The computer readable storage medium as defined in claim 1, wherein the relationship between the face images is weighted according to a direction obtained by measuring between the face images of the characters.

3. The computer readable storage medium as defined in claim 1, wherein the relationship between the face images is weighted according to a size obtained by measuring the face images of the characters.

4. The computer readable storage medium as defined in claim 1, wherein the relationship between the face images is weighted according to a facial expression obtained by identifying each of the face images of the characters.

5. The computer readable storage medium as defined in claim 1, the program further comprising a step of adjusting color of each of the face images synthesized with the template according to the template.

6. The computer readable storage medium as defined in claim 1, the program further comprising a step of:
outputting successively a plurality of image data comprising the synthesized image data together with music,
wherein a timing of outputting the synthesized image data is set according to the music.

7. The computer readable storage medium as defined in claim 1, wherein said image data is an image data which is specified from among a plurality of image data which constitutes a movie.

8. The computer readable storage medium as defined in claim 1, the program further comprising a step of outputting the synthesized image data by at least one of printing on paper, displaying on a screen, recording on the computer-readable storage medium, and recording on another computer-readable storage medium.

9. A computer readable storage medium having embodied thereon a computer program for causing a computer to execute a synthesized image generation method for generating synthesized image data by extracting face images of characters contained in image data and synthesizing the extracted face images with a template into a plurality of synthesis positions which have been set in advance on the template, the program comprising the steps of:
detecting the face images of the characters contained in the image data;
detecting a relationship between the detected face images;
forming groups of the face images according to the relationship between the face images; and
generating the synthesized image data by synthesizing the face images of the characters with the template into the respective synthesis positions so that the face images of the characters belonging to a same group in the groups are arranged in adjacent synthesis positions.

10. The computer readable storage medium as defined in claim 9, wherein the relationship between the face images is weighted according to a direction obtained by measuring between the face images of the characters.

11. The computer readable storage medium as defined in claim 9, wherein the relationship between the face images is weighted according to a size obtained by measuring the face images of the characters.

12. The computer readable storage medium as defined in claim 9, wherein the relationship between the face images is weighted according to a facial expression obtained by identifying each of the face images of the characters.

13. The computer readable storage medium as defined in claim 9, the program further comprising a step of adjusting color of each of the face images synthesized with the template according to the template.

14. The computer readable storage medium as defined in claim 9, the program further comprising a step of:
outputting successively a plurality of image data comprising the synthesized image data together with music,
wherein a timing of outputting the synthesized image data is set according to the music.

15. The computer readable storage medium as defined in claim 7, wherein said image data is an image data which is specified from among a plurality of image data which constitutes a movie.

16. The computer readable storage medium as defined in claim 9, the program further comprising a step of outputting the synthesized image data by at least one of printing on paper, displaying on a screen, recording on the computer-readable storage medium, and recording on another computer-readable storage medium.

17. A computer readable storage medium having embodied thereon a computer program for causing a computer to execute a synthesized image generation method for generating synthesized image data by extracting face images of characters contained in image data and synthesizing the extracted face images with a template into a plurality of synthesis positions which have been set in advance on the template, the program comprising the steps of:
capturing first image data and second image data separately;
detecting the face images from each of the first image data and the second image data;
measuring a movement direction and a movement amount of each of the detected face images according to the first image data and the second image data;
detecting the face images for which the measured movement amount is not less than a threshold value;
forming groups of the face images according to the measured movement direction and at least one of positions of the face images in the first image data and positions of the face images in the second image data; and
generating the synthesized image data by synthesizing the face images with the template into the respective synthesis positions so that the face images of the characters belonging to a same group in the groups are arranged in the adjacent synthesis positions.

18. The computer readable storage medium as defined in claim 17, the program further comprising a step of adjusting color of each of the face images synthesized with the template according to the template.

19. The computer readable storage medium as defined in claim 17, the program further comprising a step of:
outputting successively a plurality of image data comprising the synthesized image data together with music,
wherein a timing of outputting the synthesized image data is set according to the music.

20. The computer readable storage medium as defined in claim 17, the program further comprising a step of outputting the synthesized image data by at least one of printing on paper, displaying on a screen, recording on the computer-readable storage medium, and recording on another computer-readable storage medium.

21. A synthesized image generation apparatus which generates synthesized image data by extracting face images of characters contained in image data and synthesizing the extracted face images with a template into a plurality of synthesis positions which have been set in advance on the template, the apparatus comprising:
- a synthesis position grouping device which forms groups of the synthesis positions by combining the adjacent synthesis positions;
- a group order setting device which sets an order of the groups according to number of the synthesis positions grouped by the synthesis position grouping device;
- a face image detection device which detects the face images of the characters contained in the image data;
- a relationship detection device which detects a relationship between the face images detected by the face image detection device;
- a synthesis position adjustment device which allocates the face images to the groups of the synthesis positions in the set order by combining the face images according to the detected relationship between the face images; and
- an image synthesis device which synthesizes the face images with the template into the respective synthesis positions allocated by the synthesis position adjustment device so as to generate the synthesized image data.

22. The synthesized image generation apparatus as defined in claim 21, wherein the relationship detection device weights the relationship between the face images according to a direction obtained by measuring each of the face images of characters.

23. The synthesized image generation apparatus as defined in claim 21, wherein the relationship detection device weights the relationship between the face images according to a size obtained by measuring each of the face images of characters.

24. The synthesized image generation apparatus as defined in claim 21, wherein the relationship detection device weights the relationship between the face images according to a facial expression obtained by identifying each of the face images of the characters.

25. The synthesized image generation apparatus as defined in claim 21, wherein the image synthesis device adjusts color of each of the face images according to the template.

26. The synthesized image generation apparatus as defined in claim 21, further comprising:
- an image output device which successively outputs a plurality of image data comprising the synthesized image data together with music,
- wherein the image output device determines a timing of outputting the synthesized image data according to the music.

27. The synthesized image generation apparatus as defined in claim 21, wherein said image data is an image data which is specified from among a plurality of image data which constitutes a movie.

28. A synthesized image generation apparatus which generates synthesized image data by extracting face images of characters contained in image data and synthesizing the extracted face images with a template into a plurality of synthesis positions which have been set in advance on the template, the apparatus comprising:
- a face image detection device which detects the face images of the characters contained in the image data;
- a relationship detection device which detects a relationship between the face images detected by the face image detection device;
- a grouping device which forms groups of the face images by combining the face images according to the detected relationship between the face images;
- a synthesis position adjustment device which allocates the face images to the synthesis positions so that the face images belonging to a same group in the groups are arranged in the adjacent synthesis positions; and
- an image synthesis device which synthesizes the face images with the template into the respective synthesis positions allocated by the synthesis position adjustment device so as to generate the synthesized image data.

29. The synthesized image generation apparatus as defined in claim 28, wherein the relationship detection device weights the relationship between the face images according to a direction obtained by measuring each of the face images of the characters.

30. The synthesized image generation apparatus as defined in claim 28, wherein the relationship detection device weights the relationship between the face images according to a size obtained by measuring each of the face images of the characters.

31. The synthesized image generation apparatus as defined in claim 28, wherein the relationship detection device weights the relationship between the face images according to a facial expression obtained by identifying each of the face images of the characters.

32. The synthesized image generation apparatus as defined in claim 28, wherein the image synthesis device adjusts color of each of the face images according to the template.

33. The synthesized image generation apparatus as defined in claim 28, further comprising:
- an image output device which successively outputs a plurality of image data comprising the synthesized image data together with music,
- wherein the image output device determines a timing of outputting the synthesized image data according to the music.

34. The synthesized image generation apparatus as defined in claim 28, wherein said image data is an image data which is specified from among a plurality of image data which constitutes a movie.

35. A synthesized image generation apparatus which generates synthesized image data by extracting face images of characters contained in image data and synthesizing the extracted face images with a template into a plurality of synthesis positions which have been set in advance on the template, the apparatus comprising:
- a face image detection device which detects the face images of the characters from first image data and second image data which are captured separately;
- a movement direction measurement device which measures a movement direction of each of the face images detected by the face image detection device;
- a movement amount measurement device which measures a movement amount of each of the face images detected by the face image detection device;
- a face image grouping device which detects the face images for which the measured movement amount is not less than a threshold value so as to form group of the detected face images according to the movement direction and at least one of positions of the face images in the first image data and positions of the face images in the second image data;
- a synthesis position adjustment device which allocates the face images to the respective synthesis positions so that the face images of the characters belonging to a same group in the groups are arranged in the adjacent synthesis positions; and
- an image synthesis device which synthesizes the face images with the template into the respective synthesis positions allocated by the synthesis position adjustment device so as to generate the synthesized image data.

36. The synthesized image generation apparatus as defined in claim 35, wherein the image synthesis device adjusts color of each of the face images according to the template.

37. The synthesized image generation apparatus as defined in claim 35, further comprising:
- an image output device which successively outputs a plurality of image data comprising the synthesized image data together with music,
- wherein the image output device determines a timing of outputting the synthesized image data according to the music.

38. A computer readable storage medium having embodied thereon a computer program for processing by a computer, the computer program comprising:
- a first code segment for forming groups of a plurality of synthesis positions by combining the adjacent synthesis positions, the synthesis positions having been set in advance on a template;
- a second first code segment for setting an order of the groups according to number of synthesis positions belonging to each of the groups;
- a third code segment for detecting face images of characters contained in image data;
- a fourth code segment for detecting a relationship between the detected face images;
- a fifth code segment for distributing the face images to the groups in the set order according to the relationship between the face images; and
- a sixth code segment for generating synthesized image data by synthesizing the distributed face images with the template into the synthesis positions of the groups.

39. The computer readable storage medium of claim 38, wherein said image data is an image data which is specified from among a plurality of image data which constitutes a movie.

40. A computer readable storage medium having embodied thereon a computer program for processing by a computer, the computer program comprising:
- a first code segment for detecting face images of characters contained in image data;
- a second code segment for detecting a relationship between the detected face images;
- a third code segment for forming groups of the face images according to the detected relationship between the face images; and
- a fourth code segment for generating synthesized image data by synthesizing the face images of the characters with a template into a plurality of synthesis positions so that the face images of the characters belonging to a same group in the groups are arranged in the adjacent synthesis positions, the synthesis positions having been set in advance on the template.

41. The computer readable storage medium of claim 40, wherein said image data is an image data which is specified from among a plurality of image data which constitutes a movie.

42. A computer readable storage medium having embodied thereon a computer program for processing by a computer, the computer program comprising:
- a first code segment for capturing first image data and second image data separately;
- a second code segment for detecting the face images from each of the first image data and the second image data;
- a third code segment for measuring a movement direction and a movement amount of each of the detected face images according to the first image data and the second image data;
- a fourth code segment for detecting the face images for which the measured movement amount is not less than a threshold value;
- a fifth code segment for forming groups of the face images according to the measured movement direction and at least one of positions of the face images in the first image data and positions of the face images in the second image data; and
- a sixth code segment for generating synthesized image data by synthesizing the face images with a template into a plurality of synthesis positions so that the face images of the characters belonging to a same group in the groups are arranged in the adjacent synthesis positions, the synthesis positions having been set in advance on the template.

* * * * *